US011826682B2

(12) United States Patent
Pekarsky et al.

(10) Patent No.: US 11,826,682 B2
(45) Date of Patent: Nov. 28, 2023

(54) FLOW CONTROL ELEMENTS AND FLUID APPARATUS INCLUDING THE SAME

(71) Applicant: FILTRAN, LLC, Des Plaines, IL (US)

(72) Inventors: Lev Pekarsky, Des Plaines, IL (US); Ibrahim Khalil, Des Plaines, IL (US); Karl S. Morgan, Des Plaines, IL (US); Eric Alan Saari, Des Plaines, IL (US)

(73) Assignee: FILTRAN LLC, Des Plaines, IL (US)

( * ) Notice: Subject to any disclaimer, the term of this patent is extended or adjusted under 35 U.S.C. 154(b) by 274 days.

(21) Appl. No.: 17/445,761

(22) Filed: Aug. 24, 2021

(65) Prior Publication Data

US 2023/0067418 A1    Mar. 2, 2023

(51) Int. Cl.
| | |
|---|---|
| *B01D 35/15* | (2006.01) |
| *B01D 35/157* | (2006.01) |
| *B01D 29/07* | (2006.01) |
| *B01D 29/56* | (2006.01) |
| *F16H 57/04* | (2010.01) |
| *B01D 35/027* | (2006.01) |

(52) U.S. Cl.
CPC ........... *B01D 35/157* (2013.01); *B01D 29/07* (2013.01); *B01D 29/56* (2013.01); *B01D 35/0273* (2013.01); *F16H 57/0404* (2013.01)

(58) Field of Classification Search
CPC ...... B01D 35/157; B01D 29/07; B01D 29/56; B01D 35/0273; B01D 2201/127; F16H 57/0404

See application file for complete search history.

(56) References Cited

U.S. PATENT DOCUMENTS

| | | |
|---|---|---|
| 3,747,772 A | 7/1973 | Brown |
| 4,863,602 A | 9/1989 | Johnson |
| 4,904,397 A | 2/1990 | Eimer et al. |
| 4,976,858 A | 12/1990 | Kadoya |
| 5,397,632 A | 3/1995 | Murphy, Jr. et al. |
| 5,494,575 A | 2/1996 | Kitajima et al. |

(Continued)

FOREIGN PATENT DOCUMENTS

| | | |
|---|---|---|
| CN | 1919411 | 2/2007 |
| DE | 20006981 | 6/2000 |

(Continued)

OTHER PUBLICATIONS

Office Action from corresponding U.S. Appl. No. 16/026,258, dated Jan. 10, 2020. 6 pages.

(Continued)

*Primary Examiner* — Waqaas Ali
(74) *Attorney, Agent, or Firm* — Grossman, Tucker, Perreault & Pfleger, PLLC

(57) ABSTRACT

Flow control elements (FCEs) and fluid apparatus including the same are described. In embodiments the flow control elements (FCE) include a body that includes a front side, a back side, a left side, and a right side. The body further includes a base region, an upper region, and an intermediate region between the base region and the upper region. The FCE is configured to move in response to a fluid flow (or, more specifically, a pressure differential across the FCE) to regulate a flow of fluid past the FCE. In embodiments the FCE is included in a fluid apparatus for a vehicle, such as but not limited to a suction filter for a vehicle transmission.

30 Claims, 12 Drawing Sheets

(56) References Cited

U.S. PATENT DOCUMENTS

| | | | |
|---|---|---|---|
| 6,156,089 | A | 12/2000 | Stemmer et al. |
| 6,416,570 | B2 | 7/2002 | Goto et al. |
| 7,845,500 | B2 | 12/2010 | Hueppchen et al. |
| 7,875,171 | B2 | 1/2011 | Pekarsky et al. |
| 8,246,819 | B2 | 8/2012 | Sakata et al. |
| 9,004,291 | B2 | 4/2015 | Saito et al. |
| 9,084,950 | B2 | 7/2015 | Saito et al. |
| 9,764,261 | B2 | 9/2017 | Norris et al. |
| 10,012,118 | B2 | 7/2018 | Khalil et al. |
| 10,557,560 | B2 | 2/2020 | Gandikota et al. |
| 10,753,241 | B2 | 8/2020 | Khalil et al. |
| 2003/0042185 | A1 | 3/2003 | Dockery |
| 2003/0094405 | A1 | 5/2003 | Stamey, Jr. et al. |
| 2004/0144716 | A1 | 7/2004 | Kobayashi et al. |
| 2005/0230324 | A1 | 10/2005 | Peet et al. |
| 2006/0169632 | A1 | 8/2006 | Suzuki et al. |
| 2006/0180541 | A1 | 8/2006 | Hueppchen et al. |
| 2006/0254974 | A1 | 11/2006 | Khalil et al. |
| 2007/0151906 | A1 | 7/2007 | Beer et al. |
| 2007/0256399 | A1 | 11/2007 | Yang |
| 2008/0245721 | A1 | 10/2008 | Asahina et al. |
| 2008/0290013 | A1 | 11/2008 | Stausberg et al. |
| 2010/0038845 | A1 | 2/2010 | Baena, Jr. et al. |
| 2010/0162988 | A1 | 7/2010 | Enokida |
| 2011/0174704 | A1 | 7/2011 | Yamada et al. |
| 2011/0259810 | A1 | 10/2011 | Sakata et al. |
| 2012/0217191 | A1 | 8/2012 | Gröner et al. |
| 2012/0305469 | A1 | 12/2012 | Stausberg et al. |
| 2013/0008845 | A1 | 1/2013 | Saito et al. |
| 2013/0118964 | A1 | 5/2013 | Dedering |
| 2013/0146526 | A1 | 6/2013 | Saito et al. |
| 2014/0197085 | A1 | 7/2014 | Stausberg et al. |
| 2015/0265950 | A1 | 9/2015 | Norris et al. |
| 2016/0115919 | A1* | 4/2016 | Nishio ............... F02M 37/46 210/416.4 |

FOREIGN PATENT DOCUMENTS

| | | |
|---|---|---|
| FR | 2989444 | 10/2013 |
| GB | 2374298 | 10/2002 |
| JP | U58-082598 | 6/1983 |
| JP | 58-189015 | 11/1983 |
| JP | 63-136710 | 9/1988 |
| JP | U63-141618 | 9/1988 |
| JP | 64-043324 | 2/1989 |
| JP | 02-040415 | 3/1990 |
| JP | U04-000915 | 1/1992 |
| JP | 7-256016 | 10/1995 |
| JP | 11-319436 | 11/1999 |
| JP | 2000-279718 | 10/2000 |
| JP | 2001-120937 | 5/2001 |
| JP | 2002-186807 | 7/2002 |
| JP | 2002-273116 | 9/2002 |
| JP | 2003-042272 | 2/2003 |
| JP | 2004-353783 | 12/2004 |
| JP | 2006-205133 | 8/2006 |
| JP | 2006-205161 | 8/2006 |
| JP | 2006-214440 | 8/2006 |
| JP | 2006-316902 | 11/2006 |
| JP | 2007-327413 | 12/2007 |
| JP | 2011-230039 | 11/2011 |
| JP | 2013-013858 | 1/2013 |
| JP | 2013-047564 | 3/2013 |
| JP | 2013-248599 | 12/2013 |
| JP | 2016-508871 | 3/2016 |
| WO | 2014120957 | 8/2014 |

OTHER PUBLICATIONS

Office Action from corresponding U.S. Appl. No. 13/755,154, dated Apr. 11, 2016. 27 pages.
Office Action from corresponding U.S. Appl. No. 14/600,553, dated Apr. 20, 2017. 35 pages.
Office Action from corresponding U.S. Appl. No. 13/755,134, dated May 10, 2017. 20 pages.
Office Action from corresponding U.S. Appl. No. 16/026,258, dated Jun. 27, 2019. 25 pages.
Office Action from corresponding U.S. Appl. No. 13/755,134, dated Jul. 30, 2015. 24 pages.
Office Action from corresponding U.S. Appl. No. 13/755,154, dated Aug. 3, 2015. 23 pages.
Office Action from corresponding U.S. Appl. No. 14/600,553, dated Sep. 12, 2017. 27 pages.
Office Action from corresponding U.S. Appl. No. 13/755,134, dated Oct. 26, 2016. 30 pages.
Office Action from corresponding U.S. Appl. No. 13/755,134, dated Nov. 29, 2017. 15 pages.
First Office Action from related Chinese Appln. No. 201480018886.0, dated May 26, 2016. English translation attached. 22 pages.
First Office Action from related Chinese Appln. No. 201480018856.X, dated May 26, 2016. English translation attached. 16 pages.
Second Office Action from related Chinese Appln. No. 201480018856.X, dated May 26, 2016. No English translation available. 16 pages.
Notice of Allowance from related Chinese Appln. No. 201510140409.8, dated Sep. 29, 2019. English translation attached. 2 pages.
First Office Action from related Chinese Appln. No. 201510140409.8, dated Dec. 25, 2018. English translation attached. 5 pages.
Extended European Search Report from related Application No. 15165371.4, dated Jul. 13, 2015. 7 pages.
First Office Action from related European Appln. No. 15165371.4, dated Feb. 19, 2018. 6 pages.
First Office Action from related European Appln. No. 14704063.8, dated Jul. 26, 2019. 5 pages.
First Office Action from related European Appln. No. 14704064.6, dated Jul. 26, 2019. 5 pages.
Second Office Action from related European Appln. No. 15165371.4, dated Aug. 13, 2019. 5 pages.
Intent to Grant from related European Appln. No. 14704064.6, dated Jan. 13, 2021. 41 pages.
Intent to Grant from related European Appln. No. 15165371.4, dated Feb. 12, 2021. 42 pages.
Intent to Grant from related European Appln. No. 14704063.8, dated Jan. 20, 2021. 39 pages.
Communication pursuant to Rules 161(1) and 162 EPC, related to European Appln. No. 14704063.8, dated Sep. 10, 2015. 2 pages.
International Search Report and Written Opinion from corresponding PCT Appln. No. PCT/US2014/013910, dated Apr. 3, 2014. 9 pages.
First Office Action from related Japanese Appln. No. 2015-052996, dated Feb. 18, 2019. 12 pages.
First Office Action from related Japanese Appln. No. 2015-556135, dated Nov. 6, 2017. 7 pages.
Second Office Action from related Japanese Appln. No. 2015-052996, dated Jan. 20, 2020. 3 pages.
Second Office Action from related Japanese Appln. No. 2015-556135, dated Oct. 1, 2018. 4 pages.
Office Action from related Japanese Appln. No. 2015-556136, dated Aug. 13, 2018. 4 pages.
English translation of First Office Action from related Korean Appln. No. 10-2015-7023491, dated May 25, 2020. 13 pages.
Notice of Allowance from related Korean Appln. No. 10-2015-0064017, dated Mar. 29, 2017. English translation attached. 4 pages.
English translation of Office Action from related Korean Appln. No. 10-2015-0064017, dated Jun. 24, 2016. 16 pages.
First Office Action from related Mexican Appln. No. MX/a/2015/009975, dated May 9, 2018. English translation attached. 4 pages.
First Office Action from related Mexican Appln. No. MX/A/2015/009973, dated May 23, 2018. English translation attached. 5 pages.
Office Action from related Mexican Appln. No. MX/a/2015/003886, dated Mar. 26, 2015. English translation attached. 5 pages.
International Search Report and Written Opinion from related PCT Appln. No. PCT/US2014/013919, dated Apr. 3, 2014. 9 pages.
Office Action from related U.S. Appl. No. 13/755,134, dated Apr. 12, 2016. 29 pages.

(56) References Cited

OTHER PUBLICATIONS

International Search Report and Written Opinion from corresponding PCT Appln. No. PCT/US2022/075305, dated Nov. 8, 2022.

\* cited by examiner

FLOW CONTROL ELEMENTS AND FLUID APPARATUS INCLUDING THE SAME

TECHNICAL FIELD

The present disclosure relates to flow control elements and fluid apparatus including the same. In particular, the present disclosure relates to flow control elements for use in suction filters, such as but not limited to suction filters for transmissions.

BACKGROUND

Various types of filtration devices and fluid control elements are known. For example, filtration devices for use in vehicle applications (e.g., for vehicle engines, transmissions, etc.) are widely known. Some filtration devices for use in vehicle applications include a housing that forms a chamber for a filtration media (also referred to herein as "filter media" or simply, "media"), such as a felt type or pleated media that is permeable to a fluid, but which traps particles and other contaminants that may be entrained in the fluid. In some filters, one or more types of filter media are included in the housing, depending on desired filter performance characteristics.

For example, some transmission suction filters include two types of filter media, such that fluid flows predominantly through the first media type when the fluid is cold and highly viscous, whereas fluid flows through both the first and second types of media when the fluid is warm and less viscous. Such suction filters may include a flow control element to regulate the flow of fluid under different operating conditions. For example, U.S. Pat. No. 9,764,261 discloses a dual media fluid filter that includes a spring regulated hinge valve that passively regulates the size of an orifice between the two media types based on pressure drop. Similarly, U.S. Pat. No. 10,753,241 discloses a fluid filter that includes a filter pack supporting a first filter media and a second filter media, wherein a flow control element is disposed in a mounting location between the first and second filter media.

While the hinge valve and flow control elements described in the '261 and '241 patents are useful, they are not without limitations. For example, due to their configuration and operational characteristics, the hinge valve and flow control elements described in the '261 and '241 patents tend to occupy a relatively large area within the fluid filter apparatus. This limits the amount of media that can be used in such filters, particularly as the physical size of the fluid filter apparatus (i.e., the housing) may be dictated by other factors such as the size of the location in which it will be installed. This in turn can reduce the working lifetime of the fluid filter, and/or affect filtration performance.

Accordingly, a need remains in the art for improved flow control elements for various applications, and particularly for fluid filtration applications. The present disclosure is aimed at that need.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
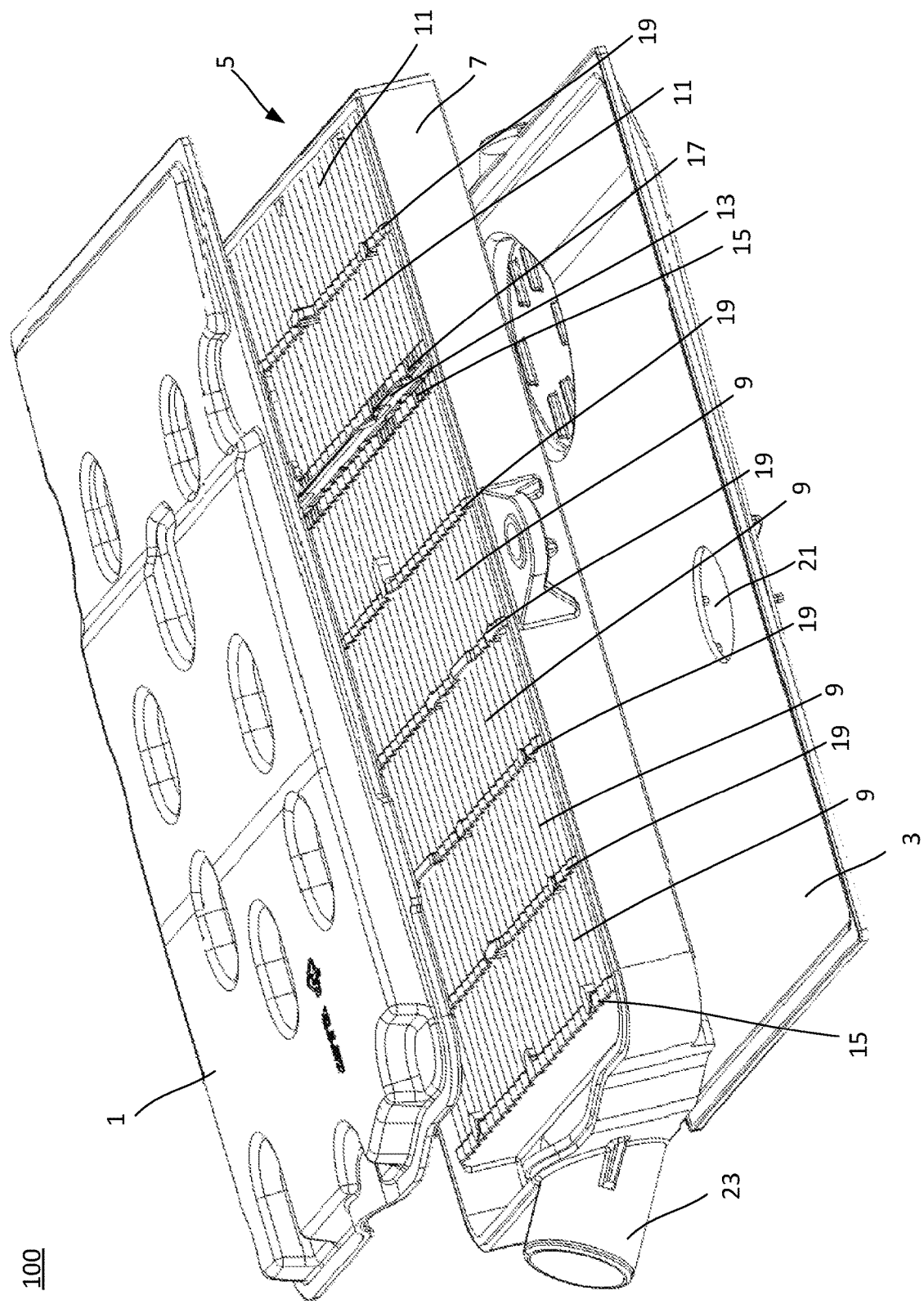
FIG. 1 is a perspective exploded diagram of a fluid apparatus including a flow control element consistent with the present disclosure.

The present disclosure generally relates to flow control elements and fluid apparatus including the same. In particular, the present disclosure relates to flow control elements for use in fluid filters, such as but not limited to suction filters for a vehicle transmission. While the present disclosure focuses on embodiments in which a flow control element is used in the context of a fluid filter such as a transmission filter, the flow control elements and fluid apparatus are not limited to such end uses. Indeed, the flow control elements described herein may be used in any application for which flow of a flow of fluid through a conduit (e.g., a pipe, filter, etc.) may be desired.

Aspects of the present disclosure relate to flow control elements for a fluid apparatus. In embodiments the flow control element (FCE) includes a body, wherein the body includes a front side, a back side, a left side, and a right side. The body further includes a base region, an upper region, and an intermediate region between the base region and the upper region. The FCE is configured to move between a first position, a second position, and a third position in response to a fluid flow (or, more particularly, a differential pressure across the FCE) to regulate a flow of fluid past the FCE. In the first position, the intermediate region and the upper region are substantially undeformed. In the second position, at least a portion of the upper region is deformed towards the back side of the FCE. In the third position, at least a portion of the intermediate region is deformed toward the back side of the FCE. In embodiments, the intermediate region includes or is in the form of a hinge, wherein the hinge may control the relative movement of the upper region relative to the base region in response to a fluid flow.

As used herein, the term "substantially undeformed" when used in reference to a portion of an FCE, means that the referenced portion of the FCE is oriented in accordance with a default position, wherein the default position is the position of the referenced element in the absence of a fluid flow from the front side to the back side of the FCE. With that in mind, the term "deformed" when used in reference to a referenced portion of the FCE, means that the referenced position has moved relative to its default position. As will be described below, in embodiments the FCEs described herein may exhibit a non-linear response to a flow of fluid from the front side to the back side thereof. As used herein, the term "non-linear response" means that a referenced portion of an FCE remains substantially undeformed in response to a differential pressure at or below a first pressure P1 across the front side to the back side of the FCE, but deforms to a first degree in response to a differential pressure P2 across the FCE, wherein P2 is greater than P1. Similarly, the referenced portion of an FCE may move to a second degree in response to a differential pressure P3 across the FCE, wherein P3>P2 and the second degree is different from the first degree of movement. Alternatively, all or a portion of an FCE described herein may exhibit a linear response to a differential pressure across the FCE (i.e., from the front side to the back side thereof). In such instances, a referenced portion of the FCE may remain substantially undeformed in response to a differential pressure across the FCE at or below P1, but may deform to a first degree in response to a differential pressure P2 across the FCE, and to a second degree at a differential pressure P3 across the FCE, wherein P2>P1, P3>P2, and the first and second degrees are the same or substantially the same as one another. Put differently, the relative movement (i.e., the first degree, second degree etc.) of the referenced portion of the FCE may be the same or different from one another depending on the desired application. In embodiments where a referenced portion of the FCE exhibits a non-linear response the second degree of movement differs from the first degree, e.g., by greater than 2%, greater than 3%, greater than 4%, or even greater than 5%. In contrast where a referenced portion of the FCE exhibits a linear response, the second degree of movement is the same or substantially the same as (i.e., less than 2% different than) the first degree of movement.

In any or all the embodiments described herein an axis A may extend through the intermediate region and through the left and right sides of the FCE. In such instances, the FCE is configured such that at least a portion of the FCE bends about the axis A when the FCE transitions from the first (substantially undeformed) position to the second (first deformed) position, and from the second (first deformed) position to the third (section deformed) position.

In any or all the embodiments described herein the base region may have a thickness T1 between the front and back sides of the FCE. In some instances, the intermediate region may include a recess (e.g., on the back or front side of the FCE) that extends between the left and right sides of the FCE. The recess may have a thickness T2 between the front and back sides of the FCE, wherein T2<T1. In some instances, the recess includes a bottom edge and a top edge and the FCE further comprises at least one flex regulating element that extends between the bottom edge and the top edge. The flex regulating element(s) may be configured to regulate an amount of force (e.g., an amount of differential pressure between front and back sides of the flow control element) needed to cause the flow control element to transition from the first (substantially undeformed) position to the second (first deformed) position, and from the second (first deformed) position to the third (second deformed) position. In embodiments, the at least one flex regulating element divides the recess into a plurality of sub recesses. For example, the at least one flex regulating element may include a plurality of flex regulating elements that each extend between the bottom edge and the top edge of the recess. In such instances, two adjacent flex regulating elements may define a sub recess therebetween. Similarly, a sub recess may be defined between a flex regulating element and an adjacent left or right edge of the back side of the FCE. In embodiments, each of the plurality of flex regulating elements may extend between the bottom edge and the top edge of a recess in the back side of the FCE. In still further embodiments, the FCE does not include a recess and one or a plurality of flex regulating elements extends from a back side of the FCE. In such instances the one or a plurality of flex regulating elements may be configured to regulate an amount of force (e.g., an amount of differential pressure between front and back sides of the flow control element) needed to cause the flow control element to transition from the first (substantially undeformed) position to the second (first deformed) position, and from the second (first deformed) position to the third (second deformed) position.

In any or all the embodiments described herein the base region may include at least one standoff extending from the back side of the FCE. In such instances the at least one standoff may be configured to at least partially define a space between the back side of the FCE and a sidewall of a mounting location in a fluid apparatus in which the FCE may be installed. In those or other instances the base region may further include a first retention element extending from the back side of the FCE. The first retention element may be configured such that when the FCE is installed in the mounting location, the first retention element interacts with a second retention element of the mounting location to retain the flow control element within the mounting location.

In some embodiments described herein the base region may further include at least one lower opening, wherein the at least one lower opening may extend from the first side to the second side of an FCE. In embodiments the at least one lower opening includes a plurality of lower openings that each extend from the first side to the second side of the FCE. In some instances, the plurality of lower openings include at least a first lower opening and a second lower opening adjacent the first lower opening. In other embodiments the base region may not include one or more lower openings, i.e., such openings may be omitted.

Other aspects of the present disclosure relate to fluid apparatus. In general, the fluid apparatus includes a frame element comprising a mounting location, and a flow control element (FCE) consistent with the present disclosure disposed within (e.g., coupled to) the mounting location. In embodiments the mounting location includes a first mounting sidewall, a second mounting sidewall, and a bottom. In such instances the base region of the FCE includes as least one standoff extending from the back side of the FCE, and a space (gap) is present between the back side of the FCE and the second mounting sidewall. The space (gap) is defined at least in part by the at least one standoff. In those or other instances, the base region of the FCE may further include at least one lower opening extending from the first side of the FCE to the second side of the FCE.

In embodiments the fluid apparatus further includes an upper housing shell and a lower housing shell. In such instances the frame element includes a peripheral frame and at least a first filter medium. The peripheral frame includes a first pair of frame sidewalls and a second pair of frame sidewalls. At least two of the upper housing shell, the lower housing shell, and the peripheral frame are joined to one another to define a chamber, with the frame element between at least a first inward facing side of the upper housing shell and a second inward facing side of the lower housing shell. In those or other embodiments the base region of the FCE may include a first retention element that extends from the back side of the FCE, and the mounting location includes a first mounting sidewall, a second mounting sidewall, a bottom, and a second retention element extending from the second mounting sidewall. In such instances the FCE is coupled to the mounting location at least in part due to interaction between the first and second retention elements.

As noted above the frame element may include a peripheral frame and a first filter medium. In such embodiments the first filter medium may have a first filtration density. In those or other embodiments the frame element may also include a second filter medium having a second filtration density, wherein the second filtration density is the same or different from the first filtration density. Without limitation, in embodiments the second filtration density differs from the first filtration density. In some embodiments, the first filter medium is divided into a plurality of first media rows, and the second filter medium is divided into a plurality of second media rows, wherein the number of first media rows is the same or different from the number of second media rows. Without limitation, in embodiments the number of first media rows differs from the number of second media rows.

In any or all the embodiments described herein the fluid apparatus includes an inlet for ingress of fluid, and an outlet for egress of fluid. In embodiments, the lower housing shell includes the fluid inlet, and the frame element includes the fluid outlet. In other embodiments, the lower housing shell includes the fluid inlet, and the upper housing shell includes the fluid outlet. In still other embodiments, the upper housing includes the fluid inlet and the frame element or the lower housing includes the fluid outlet.

In embodiments the fluid apparatus described herein is in the form of a fluid filter, such as a fluid filter for an engine or a transmission. Without limitation, in embodiments the fluid apparatus described herein is in the form of a suction filter for a transmission.

As will become apparent from the following description, the flow control elements described herein can have numerous benefits. For example, the flow control elements describe herein can be configured to exhibit a desired response to a fluid flow from the front side to the back side thereof. For example, by controlling the configuration and placement of flex regulating elements within the recess in the intermediate region, the performance of the flow control element in response to a fluid flow can be adjusted. In embodiments, the flow control element is configured to exhibit a non-linear response to a flow of fluid from the front side to the back side thereof.

In addition to being highly customizable, the flow control elements described herein may also have a relatively small footprint when installed in a fluid apparatus, relative to the footprint of other types of flow control elements. As a result, the amount of filter media that may be included as the fluid apparatus described herein may be increased relative to the amount of media that can be used with other types of flow control elements, such as those described in U.S. Pat. Nos. 9,764,261 and 10,753,241.

For the sake of illustration and ease of understanding, flow control elements consistent with the present disclosure will be described in connection with their use in a fluid apparatus, specifically a fluid suction filter for a transmission of a vehicle. It is emphasized that such description is for the sake of example only, and the flow control elements described herein are not limited to being used in fluid suction filters. Indeed, the flow control elements described herein may be used in any suitable flow control application.

Figure 2:
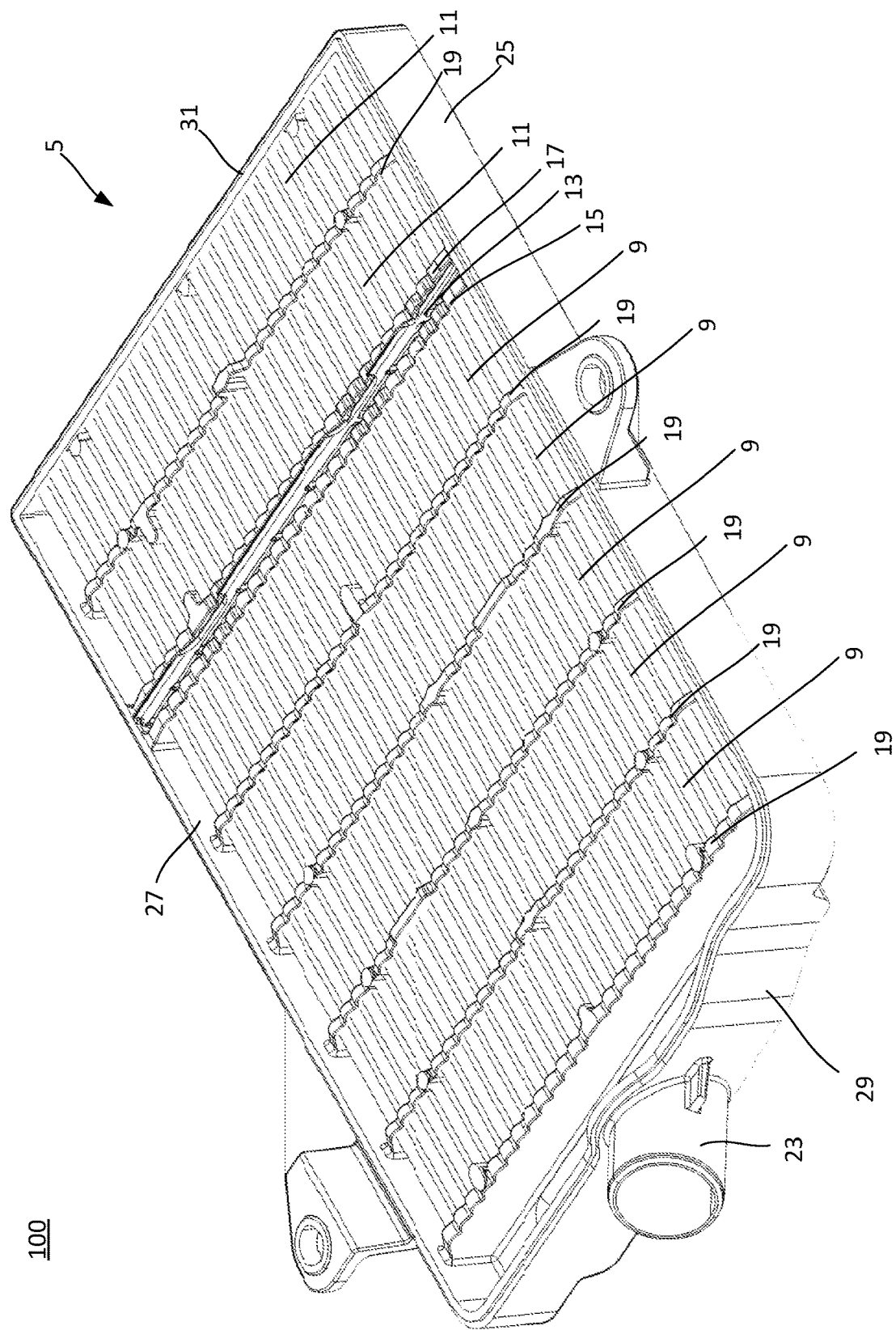
FIG. 2 is a perspective view of the fluid apparatus of FIG. 1, with the upper housing cover and lower housing cover removed.
Figure 3:
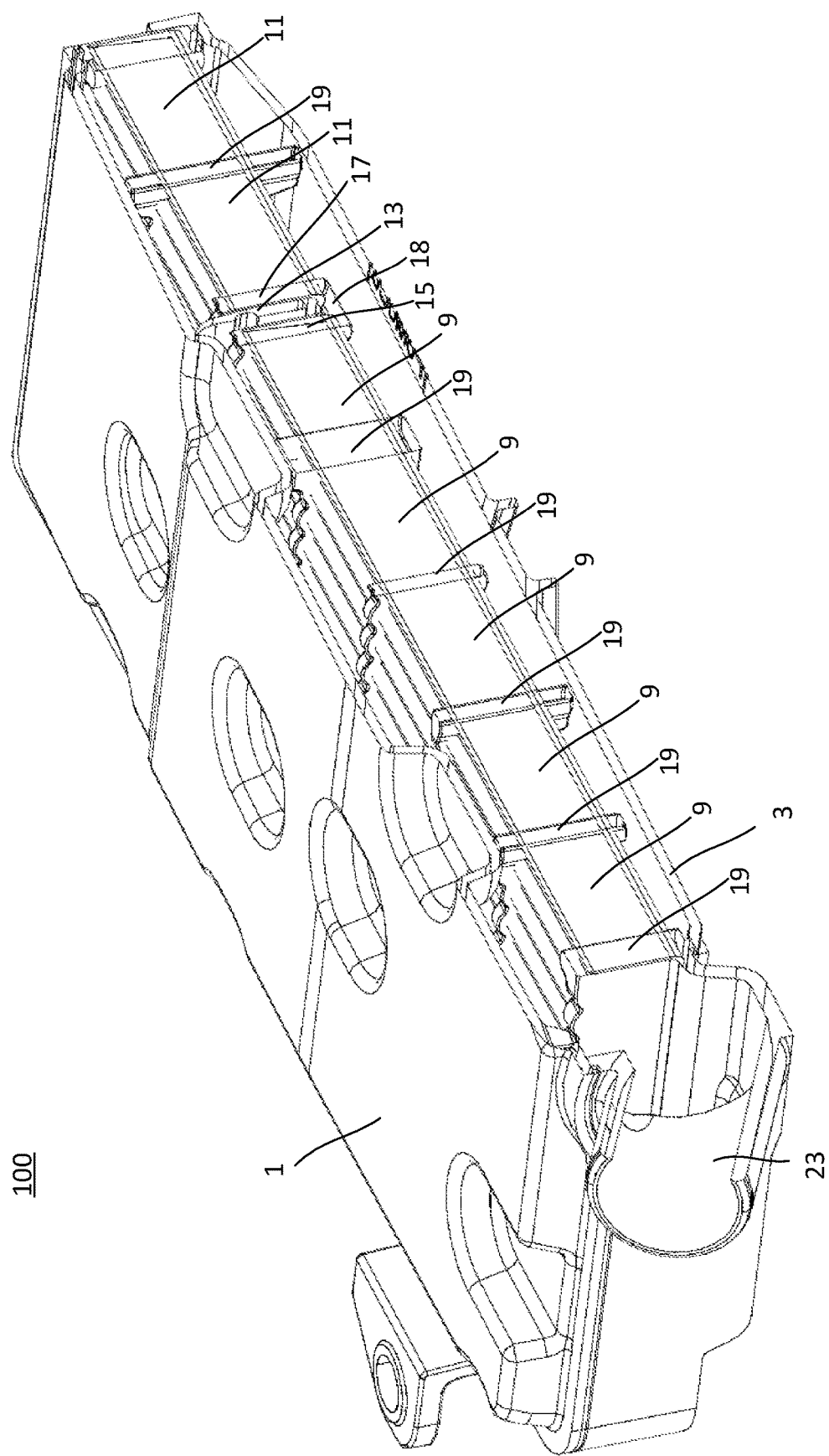
FIG. 3 is a perspective cross sectional view of the fluid apparatus of FIG. 1.
Figure 4:
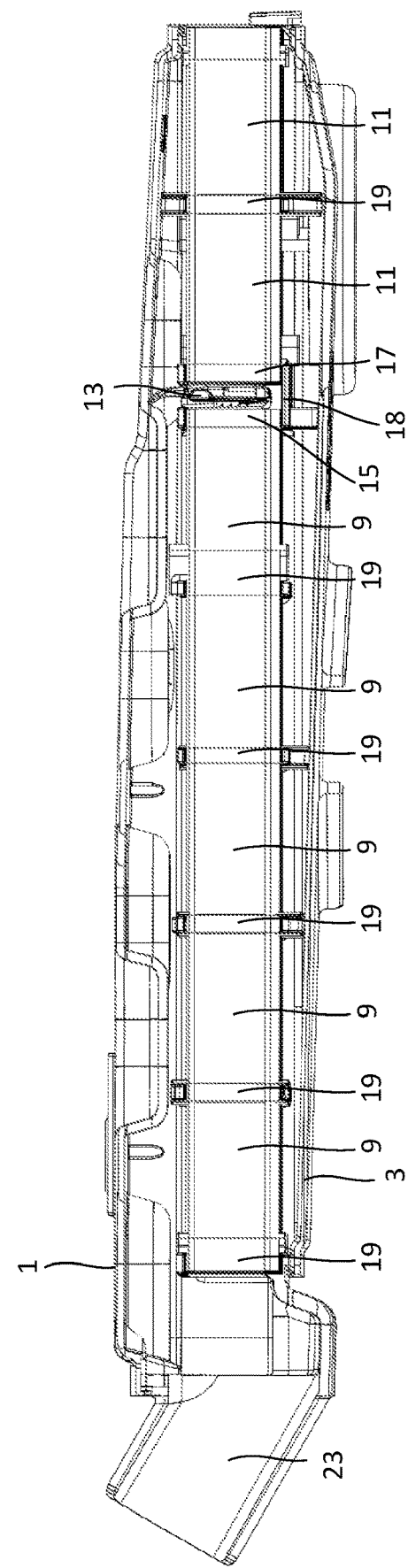
FIG. 4 is a side cross sectional view of the fluid apparatus of FIG. 1.
Figure 5:
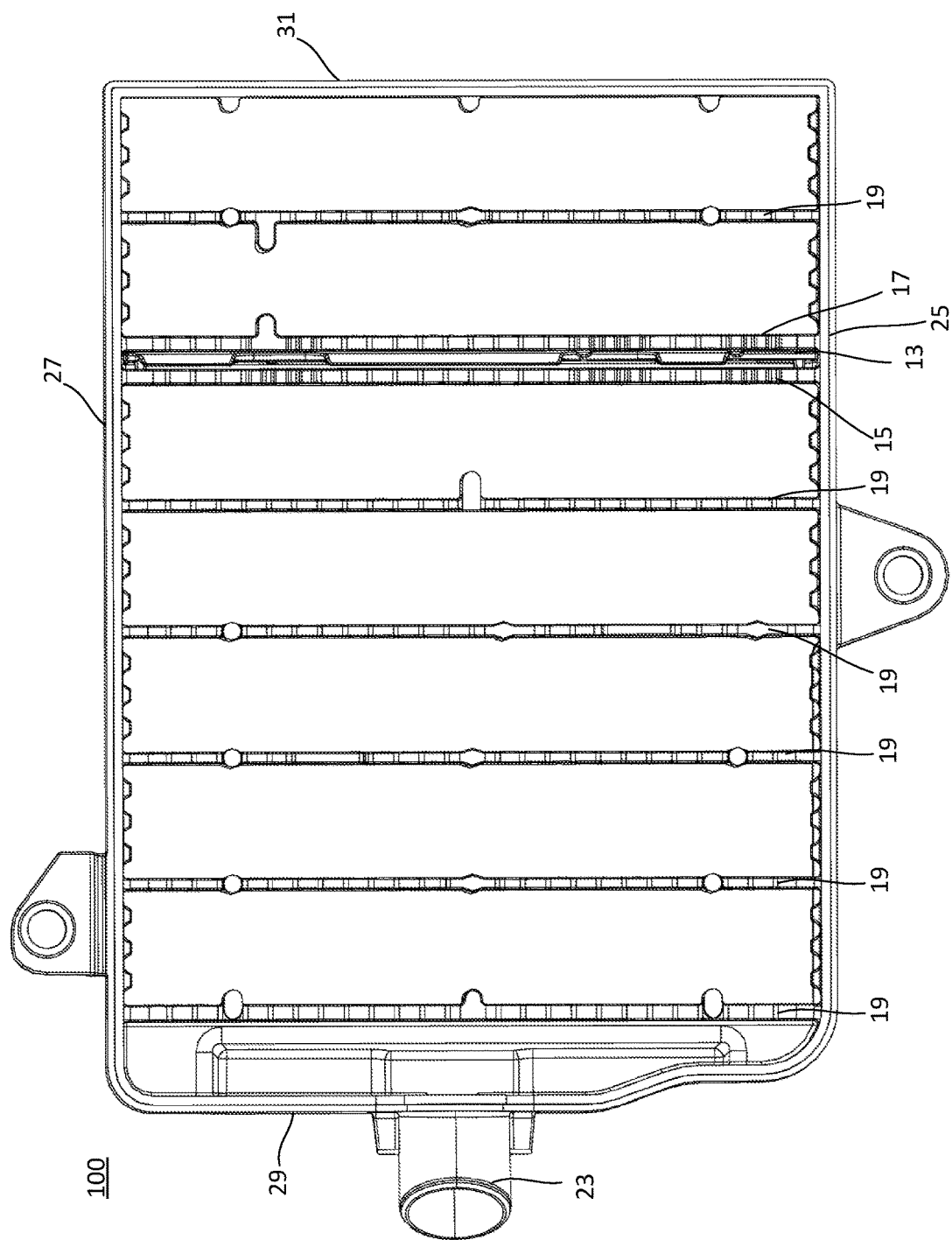
FIG. 5 is a top down view of the fluid apparatus of FIG. 1, with the upper housing cover, lower housing cover, and first and second media removed.

Reference is now made to FIGS. 1-6, which provide various view of one example of a fluid apparatus that includes a flow control element consistent with the present disclosure. In this instance the fluid apparatus is configured as a suction filter for a vehicle, but the fluid apparatus may be used in other applications. As best shown in FIG. 1, fluid apparatus 100 includes an upper housing cover 1, a lower housing cover 3, and a frame element 5 (which may also be referred to herein as a filter pack). The frame element includes a peripheral frame 7, which in this embodiment includes a first frame wall 25, a second frame wall 27, a third frame wall 29, and a fourth frame wall 31, as best shown in FIGS. 2 and 5. That is, peripheral frame may include a first pair of frame walls (i.e., first and second frame walls 25, 27) and a second pair of frame walls (i.e., third and fourth frame walls 29, 31). In embodiments and as shown in FIGS. 2 and 5, the first pair of frame walls (25, 27) may be parallel to one another, and the second pair of frame walls (29, 31) may be parallel to one another. Such a configuration is not required, however, and peripheral frame 7 may include any suitable number of frame walls (e.g., 3, 4, 5, 6, 7, 8 or more), wherein such frame walls are oriented in any suitable manner with respect to one another.

In general, peripheral frame 7 is configured to support a first filter media 9 (hereinafter, first media) and a second filter media 11 (hereinafter, second media) therein. This concept is best shown in FIG. 2, which illustrates an embodiment in which peripheral frame supports a plurality of rows of first media 9 and second media 11. In the illustrated embodiment, the five rows of first media 9 and 2 rows of second media 11 are shown, but the fluid apparats described herein are not limited to such a configuration and any suitable number of first and second media rows may be used. For example, in embodiments the peripheral frame 7 is configured to house a number a first media rows and a second number of second media rows, wherein the number of first media rows is the same as or different from the number of second media rows. In embodiments, the number of first media rows and second media rows are the same or different, and are each in a range of 1, 2, 3, 4, 5, 6, 7, 8, 9, 10 or more rows. In specific non-limiting embodiments, the number of first media rows differs from the number of second media rows, and are each in a range of 1, 2, 3, 4, 5, 6, 7, 8, 9, 10 or more rows.

As further best shown in FIG. 2, peripheral frame 7 may include one or more ribs 19 that are configured to divide first and second media 9, 11, respectively, into one or more media rows. In embodiments, ribs 19 are over molded onto first media 9 and/or second media 11, but such a configuration is not required. For example, and as best shown in FIG. 3, ribs 19 may extend from the top to the bottom of peripheral frame 7 so as to divide the first and second media into one or more rows. Ribs 19 may also be integral with or coupled to one or more walls of peripheral frame 7. For example, ribs 19 may be coupled to one or more walls of peripheral frame 7 via welding, a fastener, an adhesive, a mechanical joint (e.g., an interference fit or other suitable joint between an end of a rib 19 and a corresponding feature of peripheral frame 7) combinations thereof, or the like. Alternatively, ribs 19 may be integral with one or more walls of peripheral frame 7. Ribs 19 are preferable integral with one or more walls of peripheral frame 7, such as first frame wall 25, second frame wall 27, third frame wall 29, and/or fourth frame wall 31. Without limitation, ribs preferably extend between first and second frame walls 25, 27, between third and fourth frame walls 29, 31, or any other pair of frame walls 25, 27, 29, 31.

The type and nature of filter media used as first media and second media 11 are not limited, and any suitable type of filter media may be used. In embodiments and as best shown in FIG. 2, first media 9 is or includes a first pleated filter media and second media 11 is or includes a second pleated filter media. In those or other instances, first media 9 may have a first filtration density, which is the same as or differs from a second filtration density of second media 11. Without limitation, in embodiments the first filtration density (of first media 9) preferably differs from (i.e., is greater than or less than) the second filtration density (of second media 11). For example, in embodiments the first filtration density is higher than the second filtration density. In other embodiments, the first filtration density is less than the second filtration density.

Figure 6:
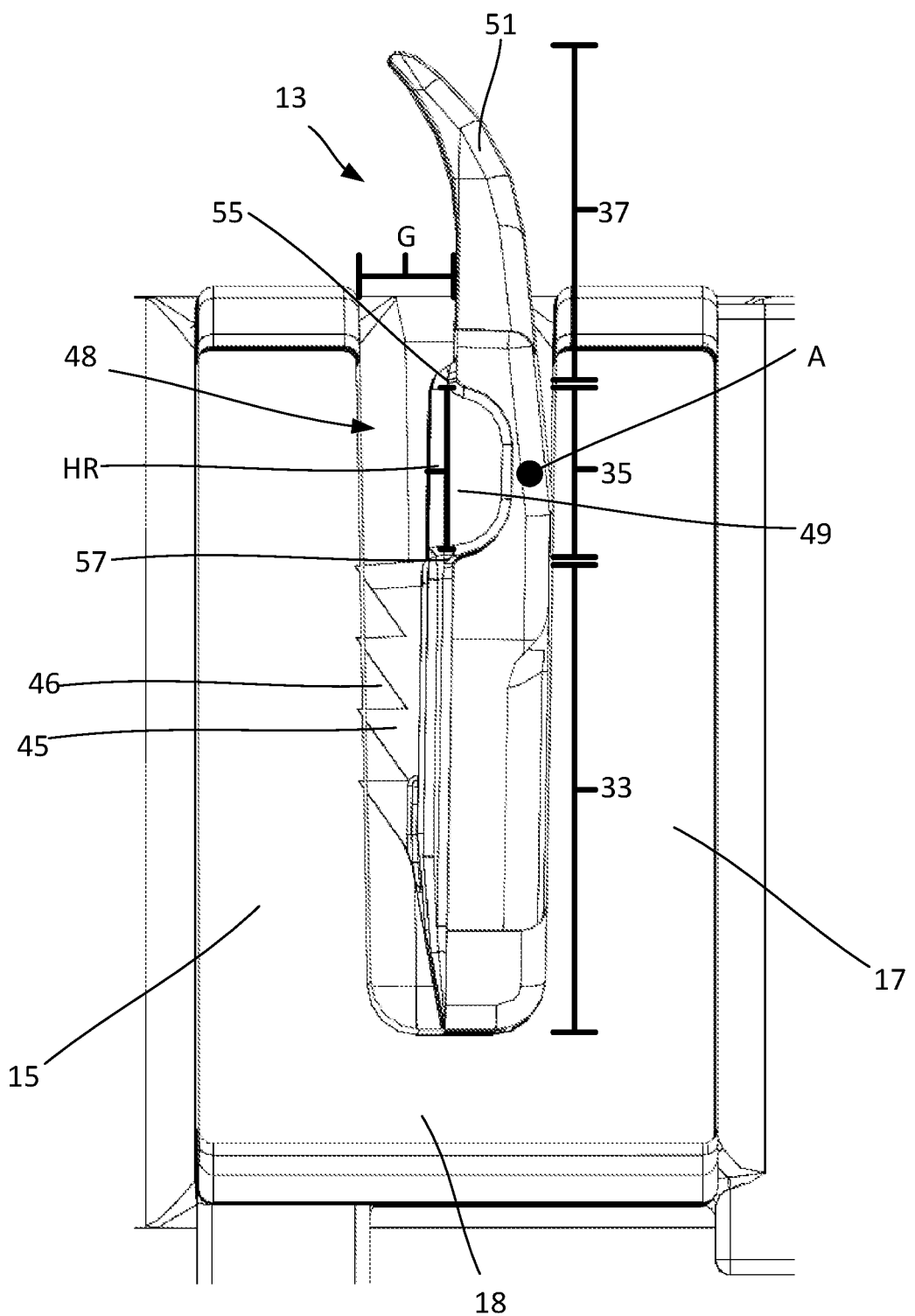
FIG. 6 is a side cross sectional view of a flow control element in a mounting location of the fluid apparatus of FIG. 1.

As best shown in FIGS. 1, 2, and 5, first media 9 and second media 11 are separated by a flow control element (FCE) 13, the nature and configuration of which will be described in detail later. As best shown in FIGS. 4, 5, and 6, in this embodiment FCE 13 is mounted (e.g., coupled) within a mounting location of frame element 5 or, more specifically, of peripheral frame 7. In this embodiment the mounting location includes a mounting cavity that is defined at least in part by a first mounting sidewall 15, a second mounting sidewall 17, and a bottom 18. The first and second mounting sidewalls 15, 17 extend between two walls of peripheral frame 7. In the illustrated embodiment the first and second mounting sidewalls extend between first frame wall 25 and second frame wall 27, but such a configuration is not required. For example, first and second mounting sidewalls 15, 17 may be configured to extend between third and fourth frame walls 29, 31, between first and third frame walls 25, 29, between first and fourth frame walls 25, 31, between second and third frame walls 27, 29, and/or between second and fourth frame walls 27, 31. In any case, the mounting cavity may also be defined by at least a portion of the walls between which first and second mounting sidewalls 15, 17 extend. For example and as best shown in FIG. 5, when first and second mounting sidewalls 15, 17 extend between first and second frame walls 25, 27, the mounting cavity may also be defined at least in part by a portion of a first frame wall 25 and a portion of a second frame wall 27.

Put differently, the mounting location may include a mounting cavity that has a front, back, a left side, a right side, and a bottom. In such instances the first mounting sidewall 15 may define at least part of the back side of the mounting location, the second mounting sidewall 17 may define at least part of the front side of the mounting location, and the bottom 18 may define at least part of the bottom of the mounting location. The sides of the mounting location may be defined at least in part by one or more walls of the peripheral frame 7. In embodiments and as best shown in FIG. 5, for example, the left and right sides of the mounting location may be defined at least in part by a portion of the first frame wall 25 and the second frame wall 27, respectively. Alternatively, the left and right sides of the mounting location may be defined by a different structure, such as third and fourth frame walls 29, 31 (e.g., when first and second mounting sidewalls 15, 17 extend between third and fourth frame walls 29, 31). In still other embodiments, the left and right sides of the mounting location may be defined by one or more walls that are integrally formed with or otherwise bonded to peripheral frame 7 but are distinct and/or discrete from frame walls 25, 27, 29, 31 thereof.

The depth and width of the mounting location is not limited, and a mounting location with any suitable depth and width may be used. In embodiments, the mounting location has a depth (measured from an upper edge of first or second mounting sidewalls 15, 17 to the upper surface of bottom 18 within the mounting cavity) in a range of about 10 mm to about 25 mm, such as from about 10 mm to about 20 mm, or even from about 13 mm to about 17 mm Without limitation, the depth of the mounting location is preferably about 14 mm to about 16 mm. In those or other embodiments, the mounting location has a width (as measured between corresponding points in the sides of first and second mounting sidewalls 15, 17 facing the mounting cavity proximate the upper opening thereof) in a range of about 2 mm to about 8 mm, such as from about 2 mm to about 6 mm, or even from about 2 mm to about 5 mm Without limitation, the depth of the mounting location is preferably about 3 mm to about 4.5 mm. As may be appreciated, the width of the mounting location is small relative to mounting locations used in other types of fluid apparatus, enabling the use of larger amounts of filter media (e.g., first media 9, second media 11) in fluid apparatus 100.

Upper housing cover 1, lower housing cover 3, and frame element 5 may be coupled to one another in any suitable manner to form fluid apparatus 100. For example, peripheral frame 7 may be attached to upper housing cover 1 and lower housing cover 3 by one or more of welding (e.g., vibration welding, laser welding, ultrasonic welding, infrared welding, combinations thereof, and the like), an adhesive, mechanical fasteners, a mechanical joint, combinations thereof, and the like. In the illustrated embodiment, upper housing cover 1 and lower housing cover 3 are attached (e.g., by welding) to an upper side and lower side, respectively, of peripheral frame 7. The upper housing cover 1, frame element 5, and/or lower housing cover 3 may also include mounting bosses (not labeled) which may be used to attach fluid apparatus to a device such as a vehicle transmission. In such embodiments, the upper housing cover 1, lower housing cover 3, and peripheral frame 7 form a chamber that encompasses the first and second medias 9, 11. Such a configuration is not required, however, and fluid apparatus 100 may be configured differently. For example, in embodiments upper housing cover 1 may be attached to lower housing cover 3 (e.g., by welding, an adhesive, mechanical fasteners, etc.), to form a cavity that completely encompasses peripheral frame 7.

Fluid apparatus 100 further includes a fluid inlet 21 (for ingress of fluid) and a fluid outlet 23 (for egress of fluid). In the illustrated embodiment and as best shown in FIG. 1, the lower housing cover 3 may include the fluid inlet 21 and the frame element 5 may include the fluid outlet. Such a configuration is not required, however, and the fluid inlet and outlet may be positioned at any suitable location. For example, in embodiments lower housing cover 3 includes fluid inlet 21, and upper housing cover 1 includes fluid outlet 23. Alternatively, in embodiments upper housing cover 1 includes fluid inlet 21, and frame element 5 or lower housing cover 3 includes fluid outlet 23.

The flow control element (FCE) 13 is generally configured to regulate (independently or along with other elements such as but not limited to the type and surface area of first media 9 and second media 11) the amount of fluid that will flow through the filter media in fluid apparatus 100. As will be described in further detail below, the structure of FCE 13 may be configured to enable it to regulate fluid flow through first and second media 9, 11 as a function of temperature, viscosity, fluid pressure, pressure differential cross the front and/or back side thereof, combinations thereof, and the like.

With the foregoing in mind, reference is made to FIGS. 7-12C, which provide various views of one example of an FCE 13 consistent with the present disclosure. As shown, FCE 13 includes base region 33, an upper region 37, and an intermediate region 35 between base region 33 and upper region 37. FCE 13 further includes a front side 39, a left side 40, a back side 41, and a right side 42. Base region 33 is generally sized and configured to fit within a mounting location of a frame element of a fluid apparatus, such as but not limited to the mounting location of frame element 5 discussed previously. For example and as best shown in FIG. 6, base region 33 may be sized and configured to fit within a cavity of a mounting location of frame element 5, such that at least a portion of the front side 39 abuts second mounting sidewall 17.

Figure 7:
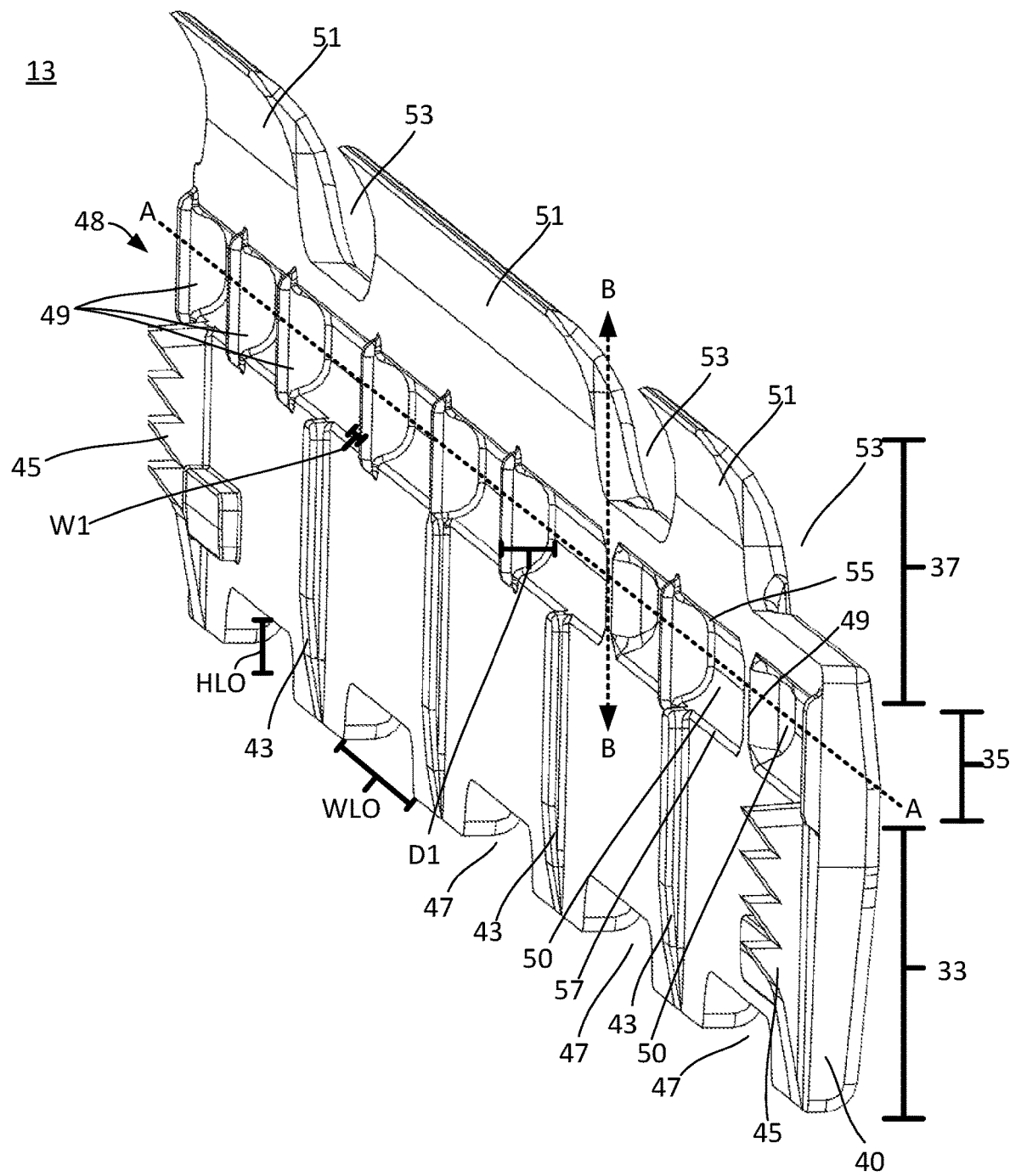
FIG. 7 is a perspective view of a flow control element consistent with the present disclosure.
Figure 8:
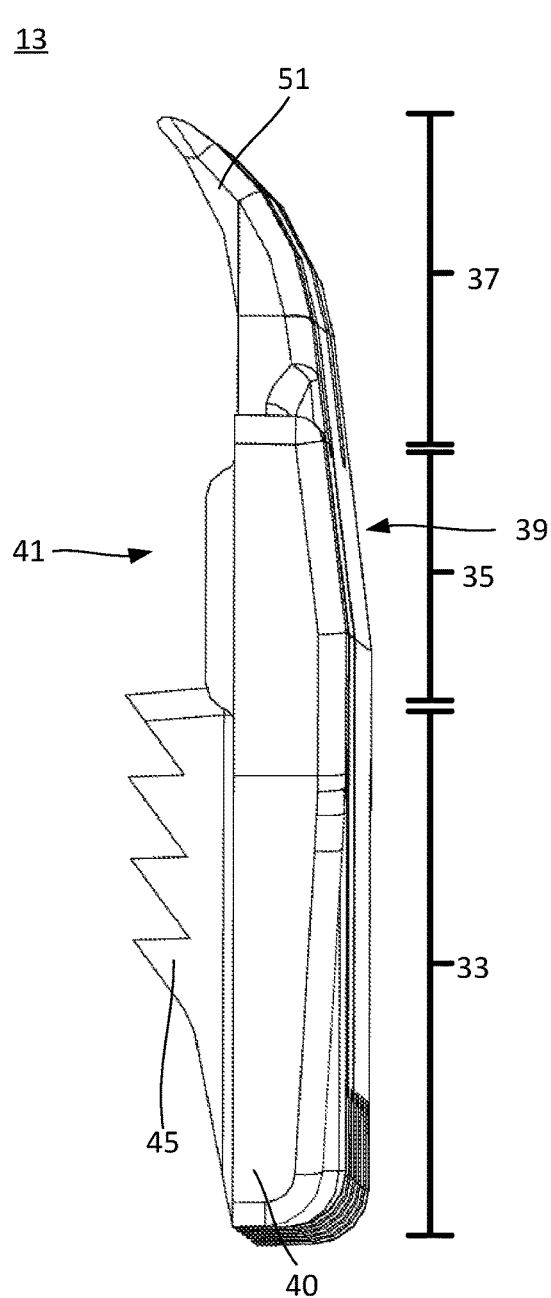
FIG. 8 is a right side view of the flow control element of FIG. 7.
Figure 9:
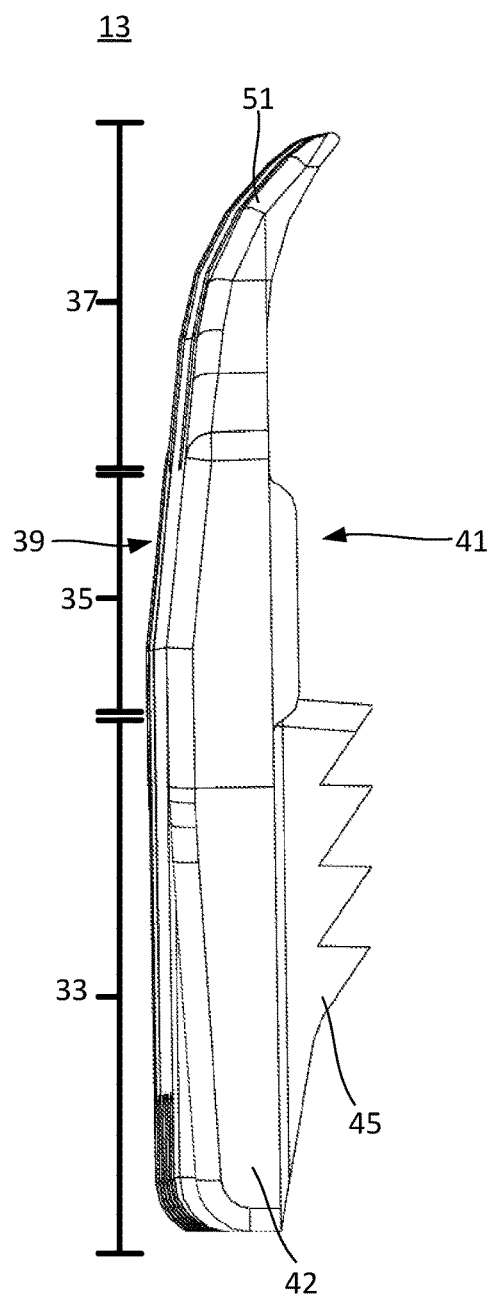
FIG. 9 is a left side view of the flow control element of FIG. 7.
Figure 10:
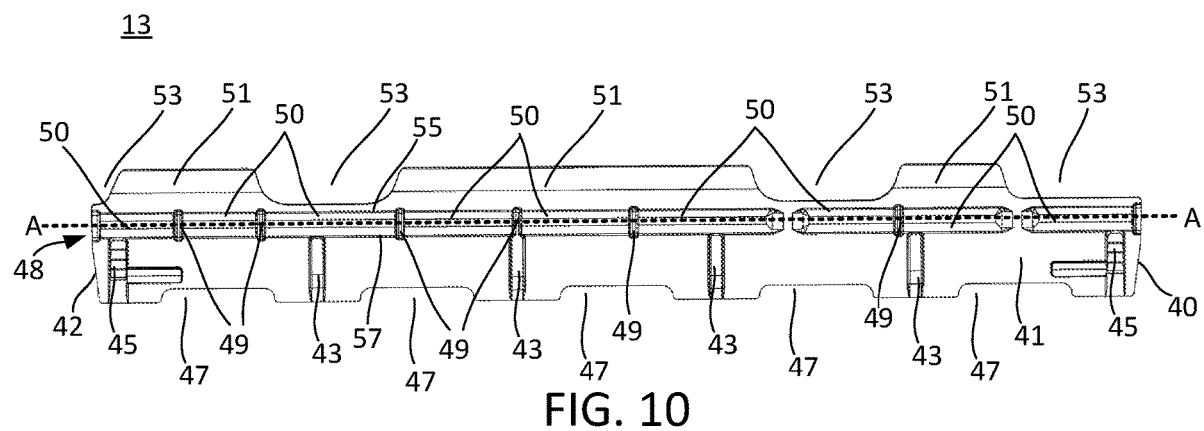
FIG. 10 is a back side view of the flow control element of FIG. 7.

Base region 33 may be further configured such that a gap G is present between at least a portion of the back side 41 of FCE 13 and the first mounting sidewall 15. FCE 13 (or more specifically, base region 33) may include one or a plurality of standoffs 43 that extend from back side 41, as best shown in FIGS. 7 and 10. The depth of at least a portion of standoffs 43 (measured from a face of standoff 43 configured to abut first mounting sidewall 15 to the face of back side 41) may be selected such that gap G has a desired size. The physical configuration of standoffs 43 is not limited, and standoffs 43 may be configured in any suitable manner. For example and as shown in FIG. 7, standoffs 43 may extend from the bottom edge 57 of a recess 48 within intermediate region 35 towards a bottom side of FCE 13. In such instances and as also shown in FIG. 7, standoffs 43 may include a tapered region (not labeled) proximate the bottom of FCE 13. In such instances the tapered region of standoffs 43 is configured such that it does not abut first mounting sidewall 15 when FCE 13 is installed in the mounting location of frame element 5. As may be appreciated, use of a tapered region may facilitate passive flow of fluid through lower openings 47 and gap G, as will be described later. Of course, standoffs 43 need not be configured in the manner shown in FIG. 7, and may be configured differently. For example, standoffs 43 may be configured without a taper, e.g., such that they extend substantially uniformly from a bottom edge 57 of recess 48 to or towards the bottom of FCE 13.

FCE 13 is configured to be retained within a mounting location of a fluid apparatus, such as a mounting location of frame element 5. The base region 33 may have a thickness T1 (shown in FIG. 12A) and may include one or more retention elements that are configured to facilitate coupling of FCE within a mounting location. The thickness T1 of the base region 33 is less than the width of the mounting cavity of the mounting location, but is otherwise not limited. In embodiments, T1 ranges from about 1.0 mm to about 5 mm, or even from about 2.0 mm to about 3.5 mm, or even from about 2.0 mm to about 3.0 mm. In those or other embodiments, the mounting cavity of the mounting location of frame element 5 may have a width in the ranges noted above.

The type and configuration of retention elements that may be used to couple FCE 13 within a mounting location are not limited, and any suitable retention elements may be used. Non-limiting examples of retention elements that can be used to couple FCE 13 within a mounting location include mechanical fasteners (e.g., screws, bolts, interference fittings, etc.), adhesives, welds, combinations thereof, and the like. Without limitation, FCE 13 preferably includes one or more FCE retention elements that are configured to form an interference fit with corresponding mount retention elements within a mounting location of a frame element. For example, and as best shown in FIGS. 6 and 7, base region 33 may include FCE retention elements 45 that extend from the back side 41 of FCE 13. In the illustrated embodiment, FCE retention elements 45 and the mounting location of frame element 5 includes mount retention elements 46. FCE retention elements 45 include teeth that extend from the back side 41 of FCE 13, and which are configured to interact with and form an interference fit joint with corresponding teeth of mount retention element(s) 46 that extend from the first mounting sidewall 15 (as best shown in FIG. 6) thereby coupling FCE 13 within the mounting location.

Figure 11:
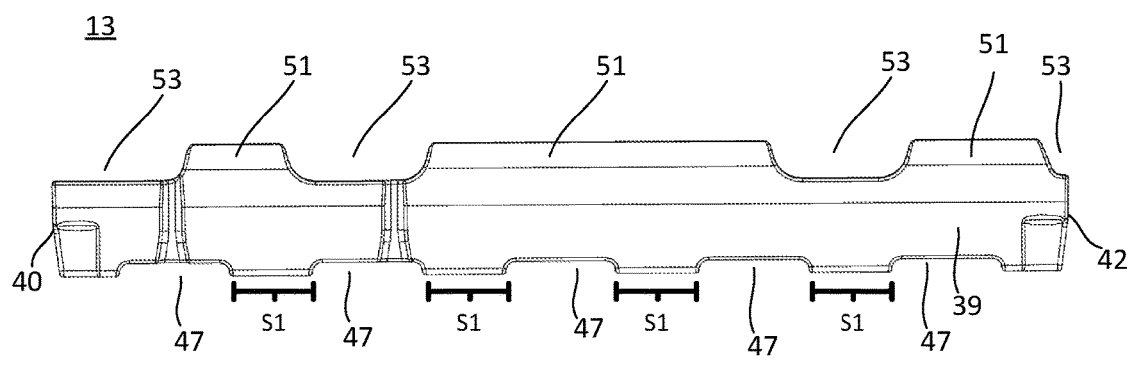
FIG. 11 is a front side view of the flow control element of FIG. 7.

In embodiments the base region of the flow control elements described herein may include one or more passive flow control openings that passively enable fluid to flow (e.g., in conjunction with gap G) through the flow control element from the front side 39 to the back side 41 thereof. This concept is shown in FIGS. 7, 10, 11, which illustrate an embodiment of FCV 13 with a base region 33 that includes a plurality of lower openings 47. The number, size, and shape of lower openings 47 is not limited, and any suitable number, size, and shape of lower openings 47 may be used. For example, the base region 33 may include greater than or equal to 1, 2, 3, 4, 5, 6, 7, 8, 9, 10 or more lower openings 47. In instances where multiple lower openings 47 are used, the size (e.g., the width WLO and/or height HLO) of such openings may be the same or different from each other. For example, the base region 33 may include a first lower opening 47 with a width WLO1 and height HLO1, a second lower opening 47 with a width WLO2 and a height HLO2, wherein WLO1 is the same or different from WLO2, and HLO1 is the same or different from HLO2. Similarly in instances where multiple lower openings 47 are used, the shape of each lower opening may be the same or different from one another. For example, the base region 33 may include a first lower opening 47 with a first shape and a second lower opening 47 with a second shape, wherein the first and second shapes are the same or different.

As may be appreciated, by controlling the size, shape and position of each lower opening 47, it is possible to control the degree to which fluid may passively flow from the back side 41 to the front side 39 of flow control element 13 and through gap G. With that in mind, in embodiments the base region 33 includes a plurality of lower openings 47, wherein each of the plurality of lower openings 47 have the same or substantially the same shape and are uniformly or nearly uniformly along the width extending between the left and right sides 40, 42 of FCE 13. In that context, "substantially uniformly spaced" means that the distance 51 between adjacent edges of adjacent lower openings 47 (as shown in FIG. 11) varies by less than or equal to 5%.

Figure 13A:
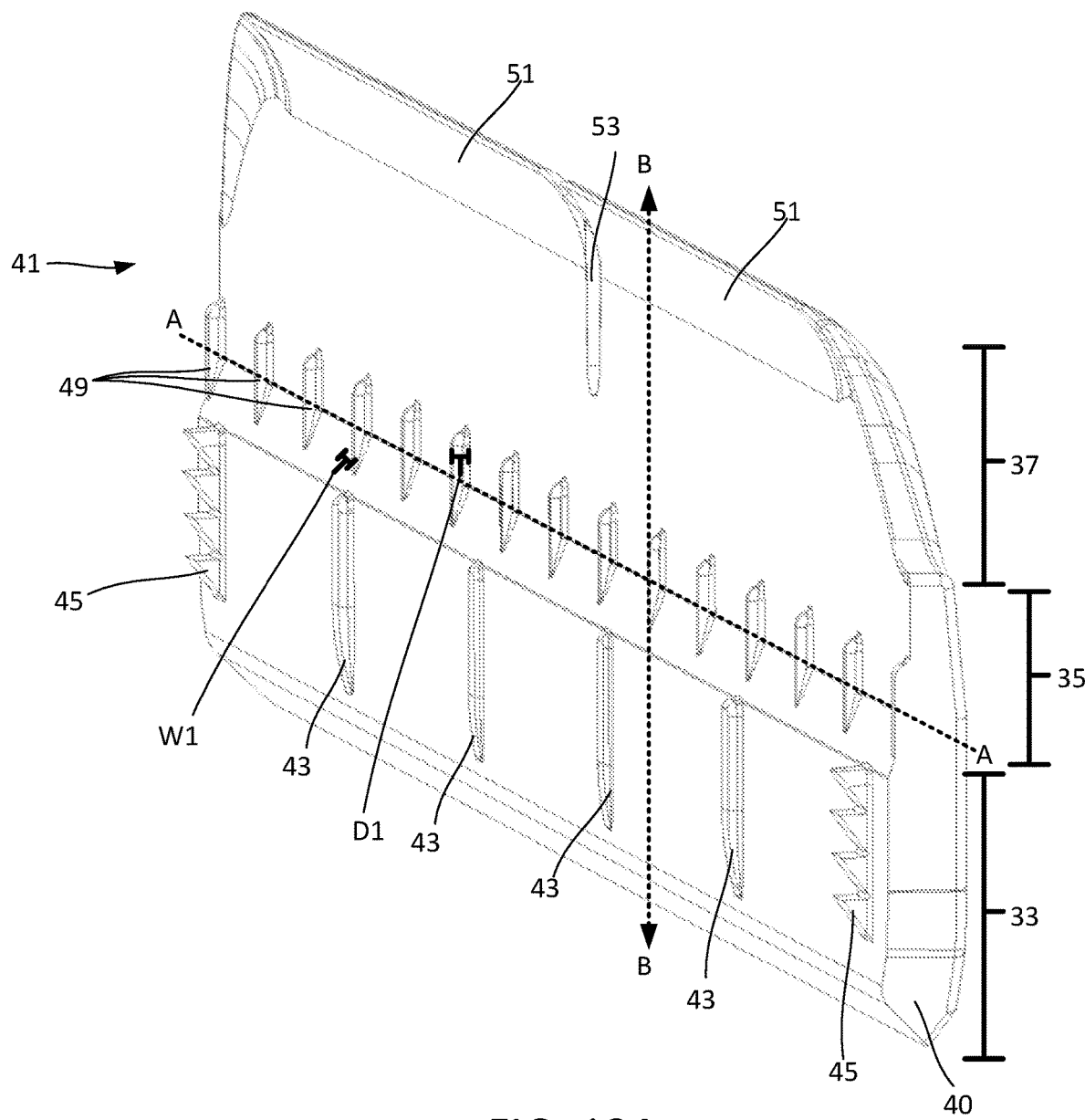
FIG. 13A is a perspective view of another example of a flow control element consistent with the present disclosure.
Figure 13B:
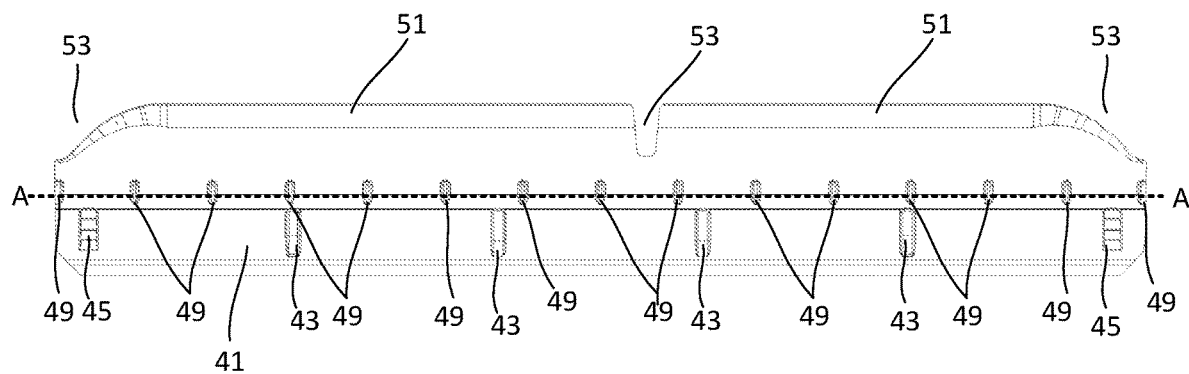
FIG. 13B is a back side view of the flow control element of FIG. 13A.
Figure 13C:
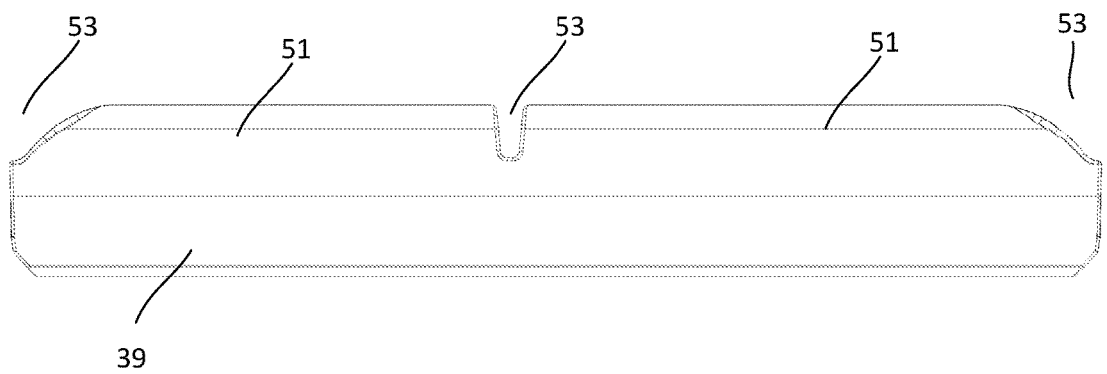
FIG. 13C is a front side view of the flow control element of FIG. 13A.

While FIGS. 7, 10, and 11 depict embodiments in which FCE 13 includes lower openings 47, the use of lower openings 47 is not required. For example, lower openings 47 may be omitted in embodiments where passive flow of fluid from the back side 41 to the front side 39 is not desired or is accomplished using other means. Accordingly, in embodiments the FCEs described herein do not include lower openings 47, but may include any or all of the other features described herein. FIGS. 13A-13C depict one example of an FCE 1300 that does not include lower openings 47, but includes many of the other features of FCE 13 described herein. Similarly and unlike FCE 13, FCE 1300 does not include a recess 50 with a top edge 55 and a bottom edge 57. Rather in FCE 1300, FREs 49 extend from the back side 41 of intermediate region 35 of FCE 1300. Like the FREs in FCE 13, the spacing and geometry of FREs 49 in FCE 1300 may be tailored to control the movement of intermediate and upper regions 35, 37, e.g., responsive to a fluid flow (or, more particularly, a differential pressure across FCE 1300).

The intermediate region 35 of FCE 13 is generally configured to control the degree to which upper region 37 moves in response to a fluid flow from the front side 39 to the back side 41. As best shown in FIGS. 7 and 10, intermediate region 35 includes a recess 48. In the illustrated embodiment, recess 48 extends from the left side 40 to the right side 42 of flow control element 13, and is formed in the back side 41 thereof. Such a configuration is not required, however, and recess 48 may be positioned differently. For example, in embodiments recess 48 may be formed in the front side 39 for FCE 13, and extend between the left and right sides 40, 42 thereof. In preferred embodiments, however, recess 48 is formed in the back side 41 of FCE 13 as shown in FIGS. 7 and 10.

Figure 12A:
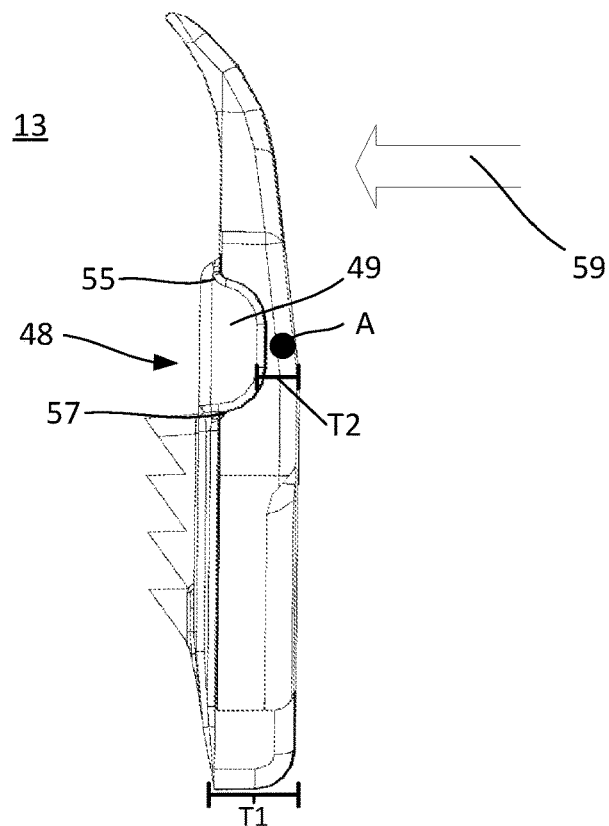
FIGS. 12A-12C are side cross-sectional views of one example of a flow control element consistent with the present disclosure, as it transitions from a first position (FIG. 12A) to a second position (FIG. 12B), and from the second position (FIG. 12B) to a third position (FIG. 12C)

The geometry of recess 48 is not limited, and recess 48 may be configured in any suitable manner depending on the desired performance of FCE 13. With that in mind, in general recess 48 is configured to at least partially define an axis A, about which the upper region 37 may deflect (e.g., by being, rotation, etc.) in response to a fluid flow from the front side 39 to the back side 41 of FCE 13. As best shown in FIGS. 7 and 10, the axis A may extend through a rear wall of recess 48 and between the left and right sides 40, 42 of FCE 13. The rear wall of recess 48 may have a thickness T2 that is less than the thickness T1 of base region 33 (as shown in FIG. 12A), so as to facilitate rotation (bending) of the upper region 37. The thickness T1 of base region 33 is within the above noted ranges. In contrast, the thickness T2 of the rear wall of recess 48 may range from about 0.5 mm to about 2.0 mm, such as from about 0.9 mm to about 1.5 mm. In embodiments, T2 is about 1.0 mm Put differently, thickness T2 may be ≤50% of T1, ≤40% of T1, ≤30% of T1, ≤20% of T1, or even ≤10% of T1. As may be appreciated, as the thickness T2 is reduced relative to T1, the amount of force (e.g., a differential pressure across front and back sides 39, 41 resulting from a fluid flow) needed to cause upper region 37 to deflect (bend) about axis A may also be reduced. Conversely, as the thickness of T2 is increased relative to T1, the amount of force (e.g., differential pressure) needed to cause upper region 37 to deflect (bend) about axis A may also be increased.

In the illustrated embodiment and as best shown in FIGS. 6 and 12A-12C, recess 48 has a c-shaped cross-sectional shape, but the recesses described herein are not limited thereto. Indeed, recess 48 may have any suitable cross sectional shape. For example, recess 48 may have a triangular, quadrilateral, pentagonal, hexagonal, circular, semicircular, or irregular cross sectional shape. In any case, recess 48 may be at least partially defined by a top edge 55 and a bottom edge 57, as best shown in FIG. 6. The distance HR between top edge 55 and bottom edge 57 be representative of a height of recess 48, and may be set based on desired performance characteristics of FCE 13. For example, increasing HR (alone or in conjunction with reducing T2) may reduce the amount of force (e.g., differential pressure) needed to cause upper region 37 to move relative to intermediate region 35 (i.e., about axis A) in response to a fluid flow. Conversely, decreasing HR (alone or in conjunction with increasing T2) may increase the amount of force (e.g., differential pressure) needed to cause upper region 37 to move relative to intermediate region 35 (i.e., about axis A) in response to a fluid flow. The distance HR may also be used to limit (set) the distance (i.e., range of motion) that upper region 37 can deflect about axis A, with a lower HR permitting a shorter range of motion than a larger HR.

The HR of recess 48 may be constant (or substantially constant) along the length of FCE 13 (i.e., between left and right sides 40, 42) or it may vary. In embodiments, the HR of recess 48 is constant or substantially constant along the length of FCE 13. In any case, the HR of recess may be in a range of about 2 mm to about 6 mm, such as from about 2 mm to about 5 mm, or even from about 2 mm to about 4 mm Without limitation, in embodiments HR is in a range of about 3 mm to about 4 mm.

Intermediate region 35 of FCE 13 may further include one or more flex regulating elements (FREs). In general, the FRE's are configured (independently or in conjunction with other features of intermediate region 35) to regulate the degree to which upper region 37 moves about axis A in response to a fluid flow from one side of FCE 13 to another side of FCE 13, such as from front side 39 to back side 41. More particularly, the FREs may be configured to adjust the amount of force (e.g., differential pressure) needed to cause upper region 37 to deflect (move) about axis A.

For example and as best shown in FIGS. 7 and 10, intermediate region 35 may include one or a plurality of FREs 49. FREs 49 are generally positioned within recess 48 and may be configured to divide recess 48 into a plurality of sub recesses 50, as best shown in FIG. 7. For example, in embodiments a single FRE 49 may be positioned within recess 48 and divide recess 48 into two sub recesses 50, wherein each sub recess 50 is bounded by the FRE 49 and a portion of either left side 40 or right side 42 of FRE 13. Similarly, two FREs 49 may be positioned within recess 48, and may divide recess 48 into three sub recesses 50. In such instances, the first sub recess 50 is bounded by one of the FREs 49 and a portion of left side 40, the second sub recess 50 is be bounded by the two FREs 49, and the third sub recess 50 is be bounded by one of the FREs 49 and a portion of right side 42. Of course, the number of FREs 49 and the number of sub recesses 50 are not limited and any suitable number of FREs 49 and sub recesses 50 may be used. For example, the flow control elements described herein may include 0, 1, 2, 3, 4, 5, 6, 7, 8, 9, 10 or more FREs 49, which may divide recess 48 into a corresponding number (e.g., 1, 2, 3, 4, 5, 6, 7, 8, 9, 10, 11, or more) of sub recesses 50. In embodiments and as shown in FIG. 7, the intermediate region 35 of FCE 13 includes eight FREs 49, which divide recess 48 into nine sub recesses 50.

As noted above FREs 49 may be used to set the amount of force (e.g., differential pressure) that is needed to cause upper region 37 to deflect about axis A, and the degree to which upper region 37 deflects about axis A in response to an applied fluid flow. More specifically, the number, position, geometry, and physical properties of FREs 49 may individually and collectively have an impact on the amount of force (e.g., differential pressure) needed to cause upper region 37 to deflect about axis A, and the degree to which upper region 37 deflects about axis A in response to a fluid flow from the front side 39 to the back side 41. With that in mind, it is noted that FREs 49 are each configured to extend between the top edge 55 and bottom edge 57 of recess 48 or a corresponding sub recess 50. Each FRE 49 is configured to deform under certain conditions (e.g., certain operating temperatures, pressures, flow rates, etc.) to regulate the force (e.g., differential pressure) needed to cause upper region to deflect about axis A, and the degree to which upper region 37 will move in response to an applied fluid flow from front side 39 to back side 41. Put differently, each FRE 49 may act as a strut that extends between top edge 55 and bottom edge 57 of recess 48 or a corresponding sub recess 50. By controlling the geometry (e.g., thickness, depth, etc.) of an FRE 49 and its physical properties (e.g., by appropriate material selection), one may control the degree to which a corresponding portion of the upper region 37 moves (deflects) about axis A in response to a fluid flow from front side 39 to back side 41.

With the foregoing in mind, FREs 49 are preferably formed from a material that is compressible in response to an applied force (e.g., differential pressure). Non-limiting examples of suitable materials that may be used to form FREs 49 include elastomeric materials, such as but not limited to Ethylene Acrylic elastomers (i.e., AEM or EA elastomers), Polyacrylate Acrylic (ACM) elastomers, Fluorocarbon/Fluoroelastomer (FKM), combinations thereof, and the like. Without limitation, all or a portion of FREs 49 are preferably formed from an AEM elastomer for transmission applications. Without limitation, all portions of FCE 13 are preferably formed from the same elastomeric material.

When a plurality of FREs 49 are used, each of the plurality of FREs 49 may be made from the same or different materials. For example, FCE 13 may include a first FRE formed from a first material and second FRE formed from a second material, wherein the first and second materials are the same or different. As may be appreciated, by forming different FRE's from different materials (e.g., materials with different stiffnesses, etc.) one may locally control the degree to which the upper region 37 bends (deflects) around axis A along the length of FCE 13. In that way, portions of FCE 13 (or, more particularly, upper region 37) may be configured to react differently to a fluid flow than other portions of FCE 13. Without limitation, in embodiments a plurality of FREs are used, and each of the plurality of FREs is formed from the same material.

The materials used to form various components of the FCEs described herein may be selected based on one or more factors, such as service temperature range, operating pressure range, cost, and material compatibility with fluid(s) in contact are factors in material selection. The material property values and their interactions with each other and the FCE dimensions and geometry can be designed/selected to obtained desired performance for a particular application. As would be understood in the art, changes to property values might impute changes to FCE design geometry to achieve desired performance. For example, material hardness (i.e. as determined by ASTM D2240-15) is one factor that can affect the degree to which a one or more components of the FCEs described herein deform in response to a pressure differential. In embodiments, all or a portion of the FCEs described herein are formed from one or more materials that have a Shore A hardness in a range of about 50 to about 100, and preferably in a range of about 60 to about 80. In addition to hardness, changes in volume, tensile strength, and elongation (i.e. as determined by ASTM D471-16a) after exposure to a fluid can affect FCE behavior and geometry. Thus, it may be desirable to select materials, dimensions, and geometry of the various components of an FCE based on test conditions that are informed by conditions that the FCE will experience while in service in a particular application. Materials that exhibit minimal or no property changes under service conditions may be preferred. Alternately, in some embodiments, changes in material properties with temperature can be used as part of intentionally designed FCE behavioral changes. Moreover, in some embodiments, FCE behavior in one or more temperature ranges may be ignored as part of larger system design tradeoffs.

In generally the FREs 49 are configured to deform in response to an applied force. The force may be a differential pressure between front side 39 and back side 41 arising from a fluid flow impinging on the front side 39 of upper region 37. For example, when a fluid flow impinging on the front side 39 of upper region 37 is below a first pressure P1, the force F1 transferred to FREs 49 (and thus, the differential pressure between front side 39 and back side 41) may be insufficient to cause FREs 49 to deform. As a result, the upper region 37 may remain substantially undeformed when the pressure of the applied fluid flow is below P1, maintaining FCE 13 in its default (closed) state. When the pressure of the fluid flow impinging on the front side 39 of upper region 37 is greater than or equal to P1, however, a force F2 is transferred to FREs 49, wherein F2>F1 (i.e., wherein the differential pressure between front side 39 and back side 41 is or equal to a first threshold). The force F2 (or differential pressure) is sufficient to cause FREs 49 to compress along an axis B as shown in FIG. 7. As FREs 49 compress along axis B, at least a portion of the upper region 37 deflects (moves) about axis A to a first degree. Consequently, at least a portion of upper region 37 is deformed (moved) towards the back side 41 of FCE 13. In some instances, at least a portion of intermediate region 35 may also be deformed (moved) toward the back side 41 when the pressure of the applied fluid flow is greater than or equal to P1.

Figure 12B:
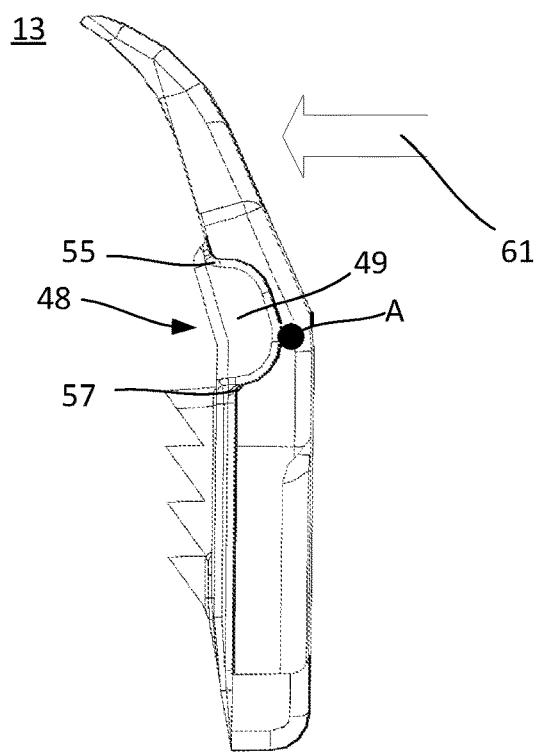

In embodiments FREs 49 (and upper region 37) may be configured to remain substantially undeformed when a fluid flow impinging on the front side 39 of upper region 37 is below a first pressure P1 (i.e., when the differential pressure is less than the first threshold). This concept is shown in FIG. 12A, which shows FCE 13 in a substantially undeformed configuration responsive to a fluid flow 59 at a pressure less than P1. When the fluid flow impinging on front side 39 of upper region 37 is greater than or equal to P1 but is less than a second pressure P2 (i.e., when the pressure differential is or equal to the first threshold but is less than a second threshold), however, FREs 49 may be configured to undergo a first deformation. In embodiments and as discussed above, during the first deformation FREs 49 may compress to a first compression degree along axis B. Alternatively or additionally, during the first deformation FREs 49 may buckle such that at least a portion of the FRE 49 is deformed to a first buckling degree towards the left and right sides of FCE 13, e.g., generally along or in a direction of axis A. In any case the first deformation causes upper region 37 to deform (e.g., move) towards the back side 41 of FCE 13 by a first amount. Put differently, the first deformation of FREs 49 causes upper region 37 to deflect about axis A by a first deformation amount, causing FCE 13 to move from its default (closed) position to a first (e.g., partially open) position. This concept is shown in FIG. 12B, which illustrates the position of FCE 13 responsive to a fluid flow 61 with a pressure P2 that is greater than P1. As shown, at least a portion of the upper region 37 is deformed (e.g., deflected) around axis A towards the back side 41. In the illustrated embodiment, a portion of intermediate region 35 (e.g., proximate the upper edge 55) is also deformed towards the back side 41.

Figure 12C:
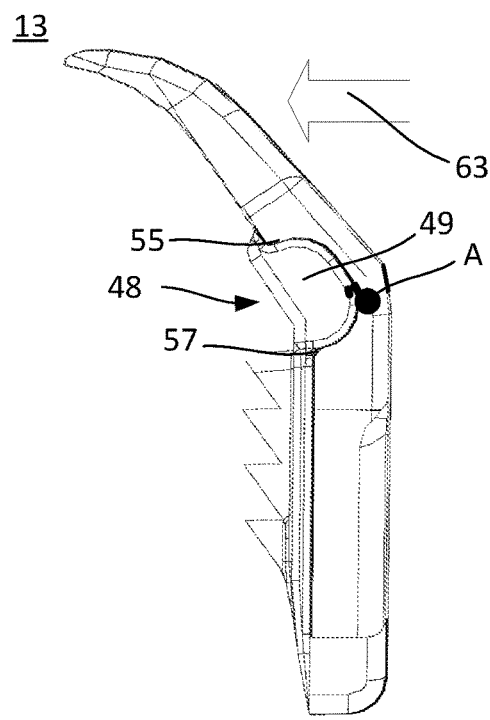

When the applied fluid flow has a pressure P3 that is greater than P2 (i.e., when the pressure differential between the front side 39 and the back side 41 is greater than or equal to a second threshold), the FREs may be configured to undergo a second deformation that causes the upper region 37 to further deform towards the back side 41, e.g., by causing upper region 37 to further rotate about axis A. This concept is shown in FIG. 12C, which illustrates the position of FCE 13 response to a fluid flow 63 with a pressure P3 that is greater than P2. As shown, upper region 37 is further deformed (e.g., by deflection/rotation about axis A) towards back side 41. Likewise, at least a portion of intermediate region 35 (again, proximate upper edge 55) is further deformed towards back side 41.

In embodiments, during the second deformation the FREs 49 compress along axis B to a second compression degree, wherein the second compression degree is greater than the first compression degree. Alternatively or additionally, during the second deformation the FREs 49 may buckle such that at least a portion of the FRE 49 is deformed to a second buckling degree towards the left and right sides of FCE 13 (e.g., generally along or in a direction of axis A), wherein the second buckling degree is greater than the first buckling degree. In any case the second deformation causes upper region 37 to deform (e.g., move) towards the back side 41 of FCE 13 by a second deformation amount, wherein the second deformation amount is greater than the first deformation amounts. Put differently, the second deformation of FREs 49 causes upper region 37 to deflect about axis A by a second deformation amount, causing FCE 13 to move to a second position that is more open than the first position.

In embodiments, the second position is a fully open position, meaning that the upper region 37 has deflected to a maximum extent around axis A. Alternatively, the second position of upper region 37 is a second partially open position. In such instances, FREs 49 may be configured to undergo third, fourth, fifth, etc. deformations, in response to a fluid flow impinging on the front side 39 of upper region 37 with a pressure that is greater than or equal to corresponding third, fourth, fifth, etc. pressures (P3, P4, P5, etc.; i.e., when the pressure differential between front side 39 and back side 41 is greater than or equal to third, fourth, fifth, etc. thresholds)). The third, fourth, fifth, etc. deformations may cause upper region 37 to move about axis A to corresponding third, fourth, first, etc. degrees, further opening FCE 13.

In embodiments FREs 49 are configured such that FCE 13 has a linear or non-linear response to an applied fluid flow. In such instances, FREs 49 may be configured to deform differently and/or to different degrees in response to different fluid pressures, thereby causing the upper region 37 to deflect to differing degrees. For example and as noted above, FREs 49 may be configured to undergo a first deformation when an applied fluid flow has a pressure that is greater than or equal to P1 but less than P2 (pressure differently greater than or equal to a first threshold), and to undergo a second deformation when the applied fluid flow has a pressure greater than P2 (pressure differential greater than or equal to the second threshold). In such instances, amount of deformation (e.g., the degree of compression, degree of buckling etc.) of the FRE 49 that occurs during the first deformation may be the same or different from the amount of deformation of the FRE 49 that occurs during the second deformation. When the amount of FRE deformation that occurs in the first deformation is the same or substantially the same as the amount FRE deformation that occurs in the second deformation, the degree to which upper region 37 deflects about axis A in response to the first and second deformations may be the same or substantially the same. That is, the degree to which upper region 37 deflects about axis A in response to the first deformation may differ from the degree to which it deflects about axis A in response to the second deformation by less than 2%. In such instances, FCE 13 may be considered to exhibit a linear response to an applied fluid flow. In contrast when the amount of FRE deformation that occurs during the first deformation substantially differs from the amount of FRE deformation that occurs during the second deformation, the degree to which upper region 37 deflects about axis A in response to the first and second deformations may be the substantially different. That is, the degree to which upper region 37 deflects about axis A in response to the first deformation may differ from the degree to which it deflects about axis A in response to the second deformation by greater than 2%, e.g., greater than or equal to 3%, 4%, or even 5% or more. In such instances, FCE 13 may be considered to exhibit a non-linear response to an applied fluid flow.

As noted above the number, geometry, and placement of FREs 49 may be configured to control the performance of FCE 13, e.g., by setting the amount of force (e.g., differential pressure) needed to cause FREs 49 to deform and, thus, setting whether and the degree to which the upper region 37 will deform (deflect) about axis A towards the back side 41 of FCE 13 in response to a fluid flow. For example and as noted above, any suitable number of FREs 49 may be used, and their distribution within recess 48 may be set in any suitable manner. In general, as the number of FREs 49 within a particular area of recess 48 (i.e., FRE density) increases, the amount of force (e.g., differential pressure) needed to cause upper region 37 to deflect about axis A increases. Similarly, as the FRE density decreases the amount of force (e.g., differential pressure) needed to cause upper region 37 to deflect about axis A decreases. When zero FREs are used, the amount of force (e.g., differential pressure) needed to deflect upper region 37 about axis A may be largely controlled by the configuration of recess 48 alone.

The geometry (height, width, shape, etc.) of each FRE 49 can also impact the amount of force (e.g., differential pressure) needed to cause the FCE to deform in response to an applied fluid flow. As a result, it may be desirable to control the geometry of each FRE 49 to achieve desired performance characteristics, such as linear vs. non-linear response, increased/decreased fluid flow past FCE 13 based on pressure hysteresis and/or fluid temperature, and/or to compensate for temperature dependent behavior of the materials used to form FCE 13. For example, by controlling the depth and width of an FRE 49, one may control the amount of force (e.g., differential pressure) that is needed to cause that FRE to deform (e.g., by compression, buckling or the like) in response to an applied force (e.g., differential pressure). By controlling the amount of force (e.g., differential pressure) needed to cause an FRE to deform, one may tune the movement of the upper region 37 (i.e., the opening and closing response of the FCE 13) in response to various factors such pressure of a fluid flow incident on front side 39, the pressure differential between front and back sides 39, 41, the temperature of the fluid, etc.

In that regard and as best shown in FIG. 7, FREs 49 may each have a depth D1 and a width W1. In general, as the D1 and/or W1 of an FRE 49 increase, the amount of force (e.g., differential pressure) needed to cause the FRE to deform (e.g., by compression, buckling, etc.) may correspondingly increase. Conversely as D1 and/or W1 of an FRE 49 decrease, the amount of force (e.g., differential pressure) needed to cause the FCE to deform may correspondingly decrease. Notably, D1 and W1 may have different impacts on different types of deformation of an FRE. For example, increasing D1 may decrease the amount of force (e.g., differential pressure) needed to cause an FRE to deform by compression, but may not impact or may decrease the amount of force needed to cause the FRE to deform by buckling. Conversely, decreasing D1 may increase the amount of force (e.g., differential pressure) needed to cause an FRE to deform by compression, but may not impact or may increase the amount of force needed to cause the FRE to deform by buckling. Similarly, increasing W1 may increase the amount of force (e.g., differential pressure) needed to cause an FRE to deform by buckling, but may not affect or may increase/decrease the amount of force needed to cause the FRE to deform by compression. Conversely, reducing W1 may reduce the amount of force (e.g., differential pressure) need to cause the FRE to deform by buckling, but may not affect or may increase/decrease the amount of force (e.g., differential pressure) needed to cause the FRE to deform by compression. Thus, by controlling D1 and W 1, one may tailor the response of each FRE 49 to an applied force (e.g., a pressure differential between front side 39 and back side 41) and thus, the degree to which upper region 37 (or a portion thereof) moves in response to a fluid flow incident on front side 39 thereof.

The depth D1 and width W1 are not limited, and FREs with any suitable D1 and W1 may be used. Without limitation, in embodiments D1 ranges from about 1.5 to about 4.0 mm, such as from about 1.7 to about 3.5 mm, or even from about 2.0 to about 3.0 mm Without limitation, in embodiments D1 is greater than or equal to the distance between top edge 55 or bottom edge 57 and the rear wall or recess 48. This concept is shown in FIG. 7, which illustrates an embodiment in which some FREs 49 have a depth D1 that is greater than the distance between the back wall of recess 48 and the top and bottom edges 55, 57 thereof, and some FREs 49 have a depth that is equal to the distance between the back wall of recess 48 and the top and bottom edges 55, 57 thereof. In those or other embodiments, W1 may range from about 0.7 to about 2.0 mm, such as from about 0.8 to about 1.5 mm, or even from about 0.8 to about 1.2 mm.

In the illustrated embodiment FREs 49 each extend to (or from) the back wall of recess 48, as best shown in FIG. 7. Such a configuration is not required, and FREs 49 need not extend to or from the back wall of recess 48. In embodiments FCE 13 is configured such that a gap is present between the back wall of recess 48 and one or more of FREs 49.

While the figures depict various examples in which FREs 49 have a linear shape that extends from the top and bottom edges 55, 57. While such FREs are useful, the FREs described herein are not limited to such a configuration and FREs with any suitable shape may be used. For example, FREs 49 may have a y shape, an asterisk shape, a c-shape, a geometric (e.g., one, three, four, five, six, seven, eight or more sided) shape, an irregular shape, or a combination thereof.

Consistent with the foregoing discussion, upper region 37 is generally configured to control an amount of fluid flow past FCE 13 depending on various factors such as fluid temperature, viscosity, and pressure. As discussed above, upper region 37 may be configured to remain substantially undeformed (i.e., in a closed position) in response to a fluid flow incident on front side 39 thereof with a pressure that is less than a first pressure P1. As best shown in FIG. 4, in the closed position the upper region 37 may extend above frame element 5 (or, more particularly, above peripheral, frame 7) towards upper housing cover 1. When the pressure of fluid flow on front side 39 exceeds P1, upper region 37 may deflect around axis A towards back side 41. This is generally shown in FIG. 12B, which shows upper region 37 deflected to a first degree in response to a fluid flow 61 with a pressure that is greater than or equal to P2, wherein P2 is greater than P1. That is, upper region 37 may move from the closed position to a first open position. In the first open position, a space between upper housing cover 1 and upper region 37 (or, more specifically, tabs 51 thereof) may develop or grow larger, allowing greater amounts of fluid to flow past FCE 13.

In some instances, upper region 37 may further move about axis A (e.g., to additional open positions) in response to increases in fluid pressure and/or fluid temperature. For example, as discussed above upper region 37 may move to a first degree (i.e., to a first open position) when a fluid is incident on front side 39 thereof at a pressure P2 that is greater than P1 but which is less than a third pressure P3. In such instances, the upper region 37 may move to a second degree (i.e., to a second open position) when the pressure of fluid incident on front side 39 is greater than or equal to P2, wherein the second open position is further open than the first open position and the second degree is greater than the first degree. That concept is shown in FIG. 12C, which shows the upper region 37 deflected about axis A to a second degree in response to a fluid flow 63 with a pressure P3 that is greater than or equal to P2.

In embodiments and as best shown in FIGS. 7, 10, and 11, upper region 37 may include a one or more tabs 51 and one or more upper openings 53. In general, the number, size, and placement of tabs 51 and upper openings 53 is configured to control the amount of fluid that flows past FCE 13 when upper region 37 is in a closed position or one or more open positions. In that regard, tabs 51 are generally configured to extend towards upper housing cover 1 (particularly when FCE 113 is in a closed position), as shown in FIG. 4. In the closed position, tabs 51 may obstruct passage of fluid in the space between upper housing cover 1 and frame element 5, e.g., between second media 11 and first media 9. In that regard, tabs 51 may be shaped by or to conform to the shape of one or more features on an inward facing side of upper cover 1. More specifically, tabs 51 may be configured to abut one or more features on an inward facing side of upper cover 3 under certain operating conditions, such as certain operating temperatures and pressures. As will be appreciated by those of ordinary skill in the art, the size, number, shape, and position of tabs 51 may impact the degree to which FCE 13 obstructs the flow of fluid in its closed and open positions. Thus, it may be desirable to control the position, size, number, and shape of tabs 51 such that FCE 13 performs in a desired manner With that in mind, any suitable number, size, and shape of tabs 51 may be used, and they may be positioned in any suitable manner. For example, in embodiments FCE 13 includes an upper region 37 that includes 1, 2, 3, 4, 5, 6, 7, 8, 9, 10 or more tabs. In instances where a single tab 51 is used, the tab 51 may continuously extend between the left and right sides 40, 42 of FCE 13 or, more specifically, of upper region 37. In instances where two or more tabs 51 are used, the size and position of each tab may be determined based on the size and positions of upper openings 53. In embodiments, upper region 37 includes at least a first tab with a first tab width and a second tab with a second tab width, wherein the first and second tab widths are the same or different from one another.

Upper openings 53 may be provided to passively allow fluid to flow through FCE 13, even when FCE 13 is in the closed state. As will be appreciated by those skilled in the art, the relative amount of fluid that may passively flow through FCE 13 in the closed state may be set based on the size, number, shape, and position of upper openings 53. In that regard, any suitable number, size, and configuration of upper openings 53 may be used, and they may be positioned at any suitable location along upper region 37. In embodiments, FCE 13 includes an upper region that includes 0, 1, 2, 3, 4, 5, 6, 7, 8, 9, 10, or more upper openings 53. In instances where a single upper opening 53 is used, upper region 37 may include two tabs that are spaced apart by the single upper opening 53. When upper region 37 includes a plurality of upper openings 53, each of the plurality of openings 53 may at least partially define (or bound) at least one of a corresponding plurality of tabs 51. As noted above, the size and positions of tabs 51 may be set based at least in part on one or more of the plurality of upper openings 53. As may be appreciated, the size and number of upper openings 53 has an impact on the area between upper housing cover 1 and frame element 5 that is obstructed by tabs 51 when FCE 13 is in the closed and open positions. Thus, by controlling the size and number of upper openings 53, one may set the relative amount of fluid that may flow past FCE 13 in the closed position and/or open position. In general, increasing the number and size (area) of upper openings 53 will reduce the size (area) of tabs 51, and allow a greater amount of fluid to flow past FCE 13 in the closed position. In contrast, reducing the number and size (area) of upper openings 53 will increase the size (area) of tabs 51, reducing the amount of fluid flow past FCE 13 in the closed position. As may be appreciated, by controlling the size and placement of upper openings 53 used in upper region 37, one may tailor the amount of fluid that can flow past FCE 13 along the length of FCE 13 (i.e., between left and right sides 40, 42.

As may be appreciated from the foregoing, the flow control elements described herein can be highly customized to provide desired control over the flow of fluid for a variety of applications. While the foregoing discussion focuses on embodiments of a flow control element that are particularly suited for fluid filtration applications—particularly for transmission suction filters—the flow control elements are not limited thereto and may be adapted for use in myriad applications in which it may be desired to control fluid flow based on fluid pressure, temperature, or a combination thereof.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A flow control element for a fluid apparatus, comprising:
a body, the body comprising:
a front side;
a back side;
a left side;
a right side;
a base region;
an upper region; and
an intermediate region between the base region and the upper region;

wherein:
the flow control element is configured to move between a first position, a second position, and a third position in response to a differential pressure between the front side and the back side resulting from a flow of fluid;
in the first position, the intermediate region and upper region are substantially undeformed;
in the second position, at least a portion of the upper region is deformed towards the back side; and
in the third position, at least a portion of the intermediate region is deformed toward the back side.

2. The flow control element of claim 1, wherein:
an axis A extends through the intermediate region and through the left side and right side; and
at least a portion of the flow control element bends about the axis A when the flow control element transitions from the first position to the second position, and from the second position to the third position.

3. The flow control element of claim 1, wherein:
The base region has a thickness T1 between the left side and the right side;
the intermediate region comprises a recess that extends between the left side and the right side, the recess having a thickness T2 between the left and right side; and
T2<T1.

4. The flow control element of claim 3, wherein:
the recess comprises a bottom edge and a top edge; and
the flow control element further comprises at least one flex regulating element extending between the bottom edge and the top edge, the at least one flex regulating element configured to regulate an amount of differential pressure needed to cause the flow control element to transition from the first position and the second position, and from the second position to the third position.

5. The flow control element of claim 4, wherein the at least one flex regulating element divides the recess into a plurality of sub recesses.

6. The flow control element of claim 4, wherein the at least one flex regulating element comprises a plurality of flex regulating elements that each extend between the bottom edge and the top edge.

7. The flow control element of claim 1, wherein:
the upper region comprises a plurality of tabs, the plurality of tabs comprising at least a first tab and a second tab adjacent the first tab; and
the upper region further comprises at least a first upper opening between the first tab and the second tab, the at least one upper opening extending through the front side and the back side to define a space between the first tab and the second tab.

8. The flow control element of claim 4, wherein:
the upper region comprises a plurality of tabs, the plurality of tabs comprising at least a first tab and a second tab adjacent the first tab; and
the upper region further comprises at least a first upper opening between the first tab and the second tab, the at least one upper opening extending through the front side and the back side to define a space between the first tab and the second tab.

9. The flow control element of claim 8, wherein the at least one flex regulating element comprises a plurality of flex regulating elements that extend between the bottom edge and the top edge.

10. The flow control element of claim 1, wherein the base region comprises at least one standoff extending from the back side, the at least one standoff configured, when the flow control element is mounted in a mounting location of said fluid apparatus, to define a space between the back side of the flow control element and sidewall of said mounting location.

11. The flow control element of claim 10, wherein the base region further comprises a first retention element extending from the back side, the first retention element configured, when the flow control element is mounted in said mounting location, to interact with a second retention element of the mounting location to retain the flow control element within the mounting location.

12. The flow control element of claim 1, wherein the base region further comprises at least one lower opening extending from the front side to the back side.

13. The flow control element of claim 12, wherein;
the at least one lower opening comprises a plurality of lower openings that each extend from the front side to the back side, the plurality of lower openings comprising at least a first lower opening and a second lower opening adjacent the first lower opening; and
the base region comprises at least a first standoff that extends from the back side to define a space between the back side of the flow control element and sidewall of a mounting location in said fluid apparatus.

14. A fluid apparatus, comprising:
a frame element comprising a mounting location; and
a flow control element disposed within the mounting location, the flow control element comprising:
a body, the body comprising:
a front side;
a back side;
a left side;
a right side;
a base region;
an upper region; and
an intermediate region between the base region and the upper region;
wherein:
the flow control element is configured to move between a first position, a second position, and a third position in response to a differential pressure between the front side and the back side resulting from a flow of fluid;
in the first position, the intermediate region and upper region are substantially undeformed;
in the second position, at least a portion of the upper region is deformed towards the back side; and
in the third position, at least a portion of the intermediate region is deformed toward the back side.

15. The fluid apparatus of claim 14, wherein:
an axis A extends through the intermediate region and through the left side and right side; and
at least a portion of the flow control element bends about the axis A when the flow control element transitions from the first position to the second position, and from the second position to the third position.

16. The fluid apparatus of claim 14, wherein:
The base region has a thickness T1 between the left side and the right side;
the intermediate region comprises a recess that extends between the left side and the right side, the recess having a thickness T2 between the left and right side; and
T2<T1.

17. The fluid apparatus of claim 16, wherein:
the recess comprises a bottom edge and a top edge; and
the flow control element further comprises at least one flex regulating element extending between the bottom edge and the top edge, the flex regulating element configured to regulate an amount of differential pressure needed to cause the flow control element to transition from the first position and the second position, and from the second position to the third position.

18. The fluid apparatus of claim 17, wherein the at least one flex regulating element divides the recess into a plurality of sub recesses.

19. The fluid apparatus of claim 17, wherein the at least one flex regulating element comprises a plurality of flex regulating elements that each extend between the bottom edge and the top edge.

20. The fluid apparatus of claim 14, wherein:
the upper region comprises a plurality of tabs, the plurality of tabs comprising at least a first tab and a second tab adjacent the first tab; and
the upper region further comprises at least a first upper opening between the first tab and the second tab, the at least one upper opening extending through the front side and the back side to define a space between the first and second tabs.

21. The fluid apparatus of claim 17, wherein:
the upper region comprises a plurality of tabs, the plurality of tabs comprising at least a first tab and a second tab adjacent the first tab; and
the upper region further comprises at least a first upper opening between the first tab and the second tab, the at least one upper opening extending through the front side and the back side to define a space between the first and second tabs.

22. The fluid apparatus of claim 21, wherein the at least one flex regulating element comprises a plurality of flex regulating elements that extend between the bottom edge and the top edge.

23. The fluid apparatus of claim 14, wherein:
the mounting location comprises a first mounting sidewall, a second mounting sidewall, and a bottom;
the base region comprises at least one standoff extending from the back side, the at least one standoff; and
a space is present between the back side of the flow control element and the second mounting sidewall, the space defined at least in part by the at least one standoff.

24. The fluid apparatus of claim 23, wherein the base region further comprises at least one lower opening extending from the first side to the second side.

25. The fluid apparatus of claim 14, further comprising:
an upper housing shell; and
a lower housing shell;
wherein:
the frame element comprises a peripheral frame and at least a first filter medium, the peripheral frame comprising a first pair of frame sidewalls and a second pair of frame sidewalls; and
at least two of the upper housing shell, the lower housing shell, and the peripheral frame are joined to one another to define a chamber, with the frame element between at least a first inward facing surface of the upper housing shell and a second inward facing surface of the lower housing shell.

26. The fluid apparatus of claim 25, wherein:
the base region comprises a first retention element extending from the back side of the flow control element;
the mounting location comprises a first mounting sidewall, a second mounting sidewall, a bottom, and a second retention element extending from the second mounting sidewall; and the flow control element is coupled to the mounting location at least in part due to interaction between the first retention element and the second retention element.

27. The fluid apparatus of claim 26, wherein:
the first filter medium has a first filtration density; and
the frame element further comprises a second filter medium, the second filter medium having a second filtration density that is the same or different from the first filtration density.

28. The fluid apparatus of claim 27, wherein:
the first filter medium is divided into a plurality of first media rows;
the second filter medium is divided into a plurality of second media rows; and
a number of the first media rows is the same or different from a number of the second media rows.

29. The fluid apparatus of claim 28, wherein the number of first media rows differs from the number of second media rows.

30. The fluid apparatus of claim 25, wherein:
the lower housing shell comprises a fluid inlet for ingress of a fluid flow into said fluid apparatus; and
the frame element comprises a fluid outlet for egress of said fluid from said fluid apparatus.

\* \* \* \* \*